US011835127B1

(12) United States Patent
Coviello et al.

(10) Patent No.: US 11,835,127 B1
(45) Date of Patent: Dec. 5, 2023

(54) GEARBOX ASSEMBLY

(71) Applicants: General Electric Company, Schenectady, NY (US); GE Avio S.r.l., Rivalta di Torino (IT); GE Aviation Czech s.r.o., Prague (CZ)

(72) Inventors: Leonardo Coviello, Bari (IT); Bugra H. Ertas, Niskayuna, NY (US); Eric R. Westervelt, Niskayuna, NY (US); Andrea Piazza, Turin (IT); Juraj Hrubec, Prague (CZ)

(73) Assignees: GENERAL ELECTRIC COMPANY, Schenectady, NY (US); GE AVIO S.R.L., Rivalta di Torino (IT); GE AVIATION CZECH S.R.O., Prague (CZ)

( * ) Notice: Subject to any disclaimer, the term of this patent is extended or adjusted under 35 U.S.C. 154(b) by 0 days.

(21) Appl. No.: 17/816,164

(22) Filed: Jul. 29, 2022

(51) Int. Cl.
*F16H 57/08* (2006.01)
*F02C 7/36* (2006.01)
*F16H 57/01* (2012.01)

(52) U.S. Cl.
CPC .............. *F16H 57/08* (2013.01); *F02C 7/36* (2013.01); *F05D 2260/40311* (2013.01); *F16H 57/01* (2013.01); *F16H 2057/085* (2013.01)

(58) Field of Classification Search
CPC .... F16H 57/08; F16H 57/01; F16H 2057/018; F02C 7/36; F05D 2260/40311; F16C 2233/00
See application file for complete search history.

(56) References Cited

U.S. PATENT DOCUMENTS

| | | | |
|---|---|---|---|
| 4,601,218 A | 7/1986 | Bohle | |
| 4,614,134 A | 9/1986 | Bohle | |
| 4,939,949 A | 7/1990 | Langenberg | |
| 5,055,092 A | 10/1991 | Langenberg et al. | |
| 8,777,800 B2 | 7/2014 | Morel | |
| 8,823,229 B2 | 9/2014 | Brieschke | |
| 9,683,553 B2 | 6/2017 | Mashtare et al. | |
| 10,487,805 B2 * | 11/2019 | Campbell | F16H 1/2863 |
| 10,677,087 B2 * | 6/2020 | Kang | F01D 21/00 |

(Continued)

FOREIGN PATENT DOCUMENTS

| | | | |
|---|---|---|---|
| CN | 104215375 A | * | 12/2014 |
| CN | 110701292 A | * | 1/2020 |

(Continued)

*Primary Examiner* — Sherry L Estremsky
(74) *Attorney, Agent, or Firm* — Venable LLP; Peter T. Hrubiec; Michele V. Frank

(57) ABSTRACT

A gearbox assembly includes a gear assembly that includes a planet gear, a pin disposed within the planet gear, a first sensor, and a second sensor. The first sensor is disposed within the pin and is configured to produce a signal indicative of a strain of the pin. The second sensor is disposed within the pin and is configured to produce a signal indicative of a vibration of the pin. Another gearbox assembly includes a gear assembly including a planet gear, a pin disposed within the planet gear, and a strain sensor. The strain sensor is disposed within the pin and is configured to produce a signal indicative of a strain of the pin. The strain sensor is located within the pin at a circumferential location of the pin that is opposite to a location of a force acting on the pin when the planet gear rotates about the pin.

20 Claims, 10 Drawing Sheets

(56) References Cited

U.S. PATENT DOCUMENTS 10,773,814 B2 * 9/2020 Strauss ................. B64D 31/06
10,794,367 B2 10/2020 Warfen et al.

FOREIGN PATENT DOCUMENTS

| | | | | |
|---|---|---|---|---|
| DE | 102017206760 A1 | * | 10/2018 | ................ F02C 7/36 |
| EP | 3020965 A1 | * | 5/2016 | ............ F03D 15/00 |
| EP | 3081831 A1 | * | 10/2016 | ............ F16H 57/01 |
| FR | 3127024 A1 | | 3/2023 | |
| FR | 3127025 A1 | | 3/2023 | |
| FR | 3129436 A1 | | 5/2023 | |
| FR | 3129690 A1 | | 6/2023 | |
| FR | 3130747 A1 | | 6/2023 | |
| FR | 3130875 A1 | | 6/2023 | |
| JP | 57018838 A | * | 1/1982 | |
| KR | 20130067375 A | * | 6/2013 | |
| WO | WO-2011104433 A1 | * | 9/2011 | ............ F03D 15/00 |

* cited by examiner

GEARBOX ASSEMBLY

TECHNICAL FIELD

The present disclosure relates generally to gearbox assemblies for turbine engines.

BACKGROUND

A turbine engine generally includes a fan and a core section arranged in flow communication with one another. A gearbox assembly is coupled between the fan and the core section.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Figure 1:
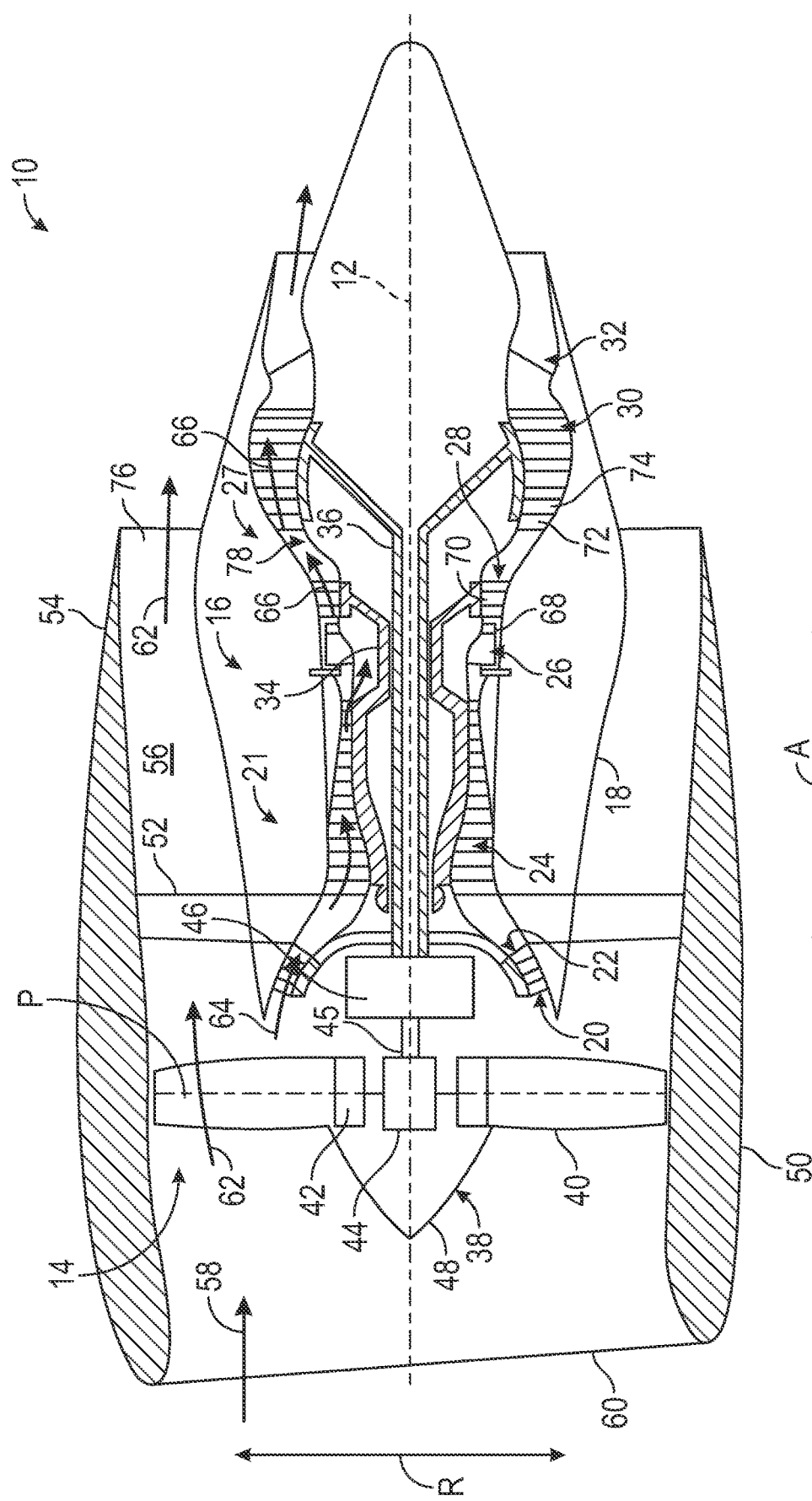
FIG. 1 is a schematic cross-sectional diagram of a turbine engine, taken along a centerline axis of the turbine engine, according to an embodiment of the present disclosure.

Additional features, advantages, and embodiments of the present disclosure are set forth or apparent from a consideration of the following detailed description, drawings, and claims. Moreover, both the foregoing summary of the present disclosure and the following detailed description are exemplary and intended to provide further explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the spirit and the scope of the present disclosure.

As used herein, the terms "first," "second," and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

A turbine engine can be configured as a geared engine. Geared engines include a power gearbox utilized to transfer power from a turbine shaft to a main fan (e.g., a fan shaft or a propeller shaft). Such gearboxes may include a sun gear, a plurality of planet gears, and a ring gear. The sun gear meshes with the plurality of planet gears and the plurality of planet gears mesh with the ring gear. In operation, the gearbox transfers the torque transmitted from the turbine shaft operating at a first speed to a fan shaft rotating at a second, lower speed. For a planet configuration of the gearbox, the sun gear may be coupled to the mid-shaft of a lower pressure turbine rotating at the first speed. The plurality of planet gears, intermeshed with the sun gear, then transfer this torque to the fan shaft through a planet carrier. In a star configuration, a ring gear is coupled to the fan shaft. In either configuration, the plurality of planet gears may include compound gears such that the plurality of planet gears each includes a first stage and a second stage. The first stage meshes with the sun gear and the second stage meshes with the ring gear.

The components of the power gearbox wear and may become damaged over a lifetime of the power gearbox. Accordingly, it is important to predict or to determine a health of the power gearbox and the components thereof prior to the components failing. Current systems for determining the health of the power gearbox may not provide accurate and precise health parameters. For example, health determination systems for power gearboxes utilize sensors placed on the outside of the power gearbox for measuring aspects of the power gearbox. Such health determination systems, however, may not accurately or precisely determine damage or other defects of the components inside the power gearbox, such as the gears, the pins, etc. Further, current health determination systems that utilize only a single sensor in the gears may not provide precise information. Accordingly, embodiments of the present disclosure provide for an improved prognostics and health management system for power gearboxes.

Embodiments of the present disclosure provide for strain gauges and accelerometers disposed within a bore of the pins of the planet gears. The strain gauges provide ways to detect overload and load share conditions on the gears through the life of the power gearbox. The accelerometers provide ways to detect acceleration or vibration of the gears. The strain gauges and the accelerometers can also be used to monitor gear mesh frequencies and roller pass frequencies, as detailed further below. Baseline strain measurements and vibration measurements are determined when the turbine engine is deployed, and the strain signatures measured by the strain gauges and the vibration signatures measured by the accelerometers are measured over time to assess planet gear health and bearing health. Additionally, the load share information can be used in combination with cycles to feed into physics-based life models to assess ger life and durability. Accordingly, maintenance intervals for the power gearbox can be scheduled. Thus, maintenance needs for the power gearbox are improved as compared to power gearboxes without the benefit of the present disclosure.

Embodiments of the present disclosure provide for detecting failure modes or changes in operation of the components of the power gearbox. The failure modes include, for example, gear tooth loading and dynamics (e.g., static and dynamic torque changes and levels), changes in load share after a high load event or off design event, or bearing race spalling (e.g., damage). Thus, embodiments of the present disclosure provide for an improved load share evaluation using strain gauges in the pin bores, improved torque measurement and dynamic torque fluctuations and cycle count to combine with physics-based models for life assessment, and prognostics and health management for gear mesh frequencies and roller pass frequencies.

The prognostics and health management system receives strain and acceleration (e.g., vibration) information for each pin of the plurality of planet gears. The system can then determine the average strain (e.g., the torque), the delta strain (e.g., overload), and time series/spectral signals for dynamic information (e.g., overloads, local damage, gear mesh frequencies, roller pass frequencies) for determining health of the various components of the power gearbox. The system can provide fleet information for an entire fleet of aircraft for maintenance management, life cycle prediction, etc., for the entire fleet. The system can also determine if a signal is missing from one or more of the strain gauges, or the accelerometers that indicate the sensor is lost, or that indicate a failure mode of one of the components. The system can then recommend an immediate action for mitigating the lost sensor or the failure mode.

Referring now to the drawings, FIG. 1 is a schematic cross-sectional diagram of a turbine engine 10, taken along a centerline axis of the turbine engine 10, according to an embodiment of the present disclosure. As shown in FIG. 1, the turbine engine 10 defines an axial direction A (extending parallel to a longitudinal, centerline axis 12 provided for reference) and a radial direction R that is normal to the axial direction A. In general, the turbine engine 10 includes a fan section 14 and a core turbine engine 16 disposed downstream from the fan section 14.

The core turbine engine 16 depicted generally includes an outer casing 18 that is substantially tubular and defines an annular inlet 20. As schematically shown in FIG. 1, the outer casing 18 encases, in serial flow relationship, a compressor section 21 including a booster or a low pressure (LP) compressor 22 followed downstream by a high pressure (HP) compressor 24, a combustion section 26, a turbine section 27 including a high pressure (HP) turbine 28 followed downstream by a low pressure (LP) turbine 30, and a jet exhaust nozzle section 32. A high pressure (HP) shaft 34 or spool drivingly connects the HP turbine 28 to the HP compressor 24 to rotate the HP turbine 28 and the HP compressor 24 in unison. A low pressure (LP) shaft 36 drivingly connects the LP turbine 30 to the LP compressor 22 to rotate the LP turbine 30 and the LP compressor 22 in unison. The compressor section 21, the combustion section 26, the turbine section 27, and the jet exhaust nozzle section 32 together define a core air flowpath.

For the embodiment depicted in FIG. 1, the fan section 14 includes a fan 38 (e.g., a variable pitch fan) having a plurality of fan blades 40 coupled to a disk 42 in a spaced apart manner. As depicted in FIG. 1, the fan blades 40 extend outwardly from the disk 42 generally along the radial direction R. Each fan blade 40 is rotatable relative to the disk 42 about a pitch axis P by virtue of the fan blades 40 being operatively coupled to an actuation member 44 configured to collectively vary the pitch of the fan blades 40 in unison. The fan blades 40, the disk 42, and the actuation member 44 are together rotatable about the centerline axis 12 via a fan shaft 45 that is powered by the LP shaft 36 across a power gearbox, also referred to as a gearbox assembly 46. The gearbox assembly 46 is shown schematically in FIG. 1. The gearbox assembly 46 includes a plurality of gears for adjusting the rotational speed of the fan shaft 45 and, thus, the fan 38 relative to the LP shaft 36 to a more efficient rotational fan speed.

Referring still to the exemplary embodiment of FIG. 1, the disk 42 is covered by a rotatable fan hub 48 aerodynamically contoured to promote an airflow through the plurality of fan blades 40. In addition, the fan section 14 includes an annular fan casing or a nacelle 50 that circumferentially surrounds the fan 38 and/or at least a portion of the core turbine engine 16. The nacelle 50 is supported relative to the core turbine engine 16 by a plurality of circumferentially spaced outlet guide vanes 52. Moreover, a downstream section 54 of the nacelle 50 extends over an outer portion of the core turbine engine 16 to define a bypass airflow passage 56 therebetween.

During operation of the turbine engine 10, a volume of air 58 enters the turbine engine 10 through an inlet 60 of the nacelle 50 and/or the fan section 14. As the volume of air 58 passes across the fan blades 40, a first portion of air 62 is directed or routed into the bypass airflow passage 56, and a second portion of air 64 is directed or is routed into the upstream section of the core air flowpath, or, more specifically, into the annular inlet 20 of the LP compressor 22. The ratio between the first portion of air 62 and the second portion of air 64 is commonly known as a bypass ratio. The pressure of the second portion of air 64 is then increased as the second portion of air 64 routed through the HP compressor 24 and into the combustion section 26, where the highly pressurized air is mixed with fuel and burned to provide combustion gases 66.

The combustion gases 66 are routed into the HP turbine 28 and expanded through the HP turbine 28 where a portion of thermal and/or of kinetic energy from the combustion gases 66 is extracted via sequential stages of HP turbine stator vanes 68 that are coupled to the outer casing 18 and HP turbine rotor blades 70 that are coupled to the HP shaft 34, thus, causing the HP shaft 34 to rotate, thereby supporting operation of the HP compressor 24. The combustion gases 66 are then routed into the LP turbine 30 and expanded through the LP turbine 30. Here, a second portion of thermal and kinetic energy is extracted from the combustion gases 66 via sequential stages of LP turbine stator vanes 72 that are coupled to the outer casing 18 and LP turbine rotor blades 74 that are coupled to the LP shaft 36, thus, causing the LP shaft 36 to rotate, thereby supporting operation of the LP compressor 22 and rotation of the fan 38 via the gearbox assembly 46.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before being exhausted from a fan nozzle exhaust section 76 of the turbine engine 10, also providing propulsive thrust. The HP turbine 28, the LP turbine 30, and the jet exhaust nozzle section 32 at least partially define a hot gas path 78 for routing the combustion gases 66 through the core turbine engine 16.

The turbine engine 10 depicted in FIG. 1 is by way of example only. In other exemplary embodiments, the turbine engine 10 may have any other suitable configuration. For example, in other exemplary embodiments, the fan 38 may be configured in any other suitable manner (e.g., as a fixed pitch fan) and further may be supported using any other suitable fan frame configuration. Moreover, in other exemplary embodiments, any other suitable number or configuration of compressors, turbines, shafts, or a combination thereof may be provided. In still other exemplary embodiments, aspects of the present disclosure may be incorporated into any other suitable gas turbine engine, such as, for example, turbofan engines, propfan engines, turbojet engines, and/or turboshaft engines.

Figure 2:
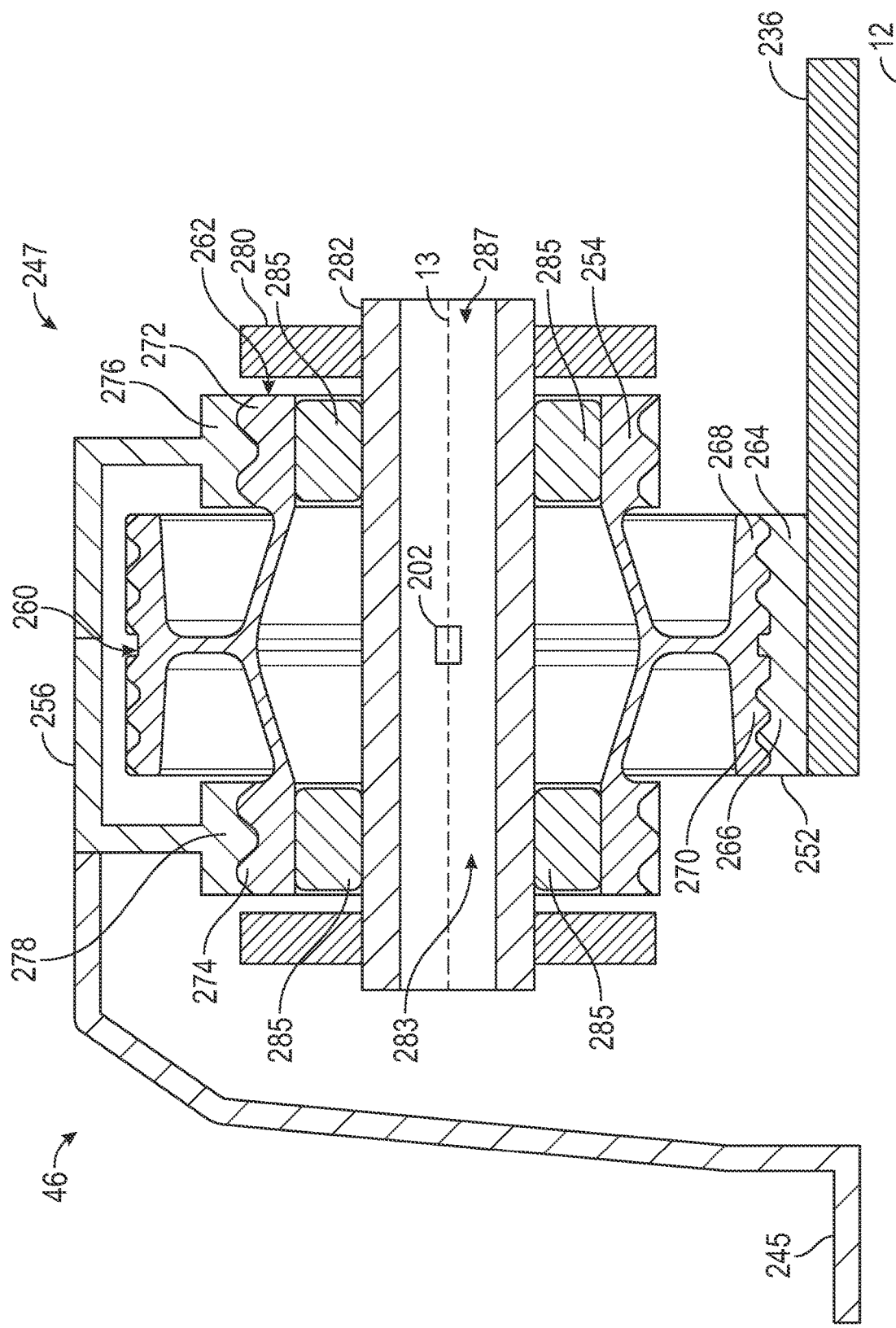
FIG. 2 is a schematic, cross-sectional side view of a gearbox assembly for a turbine engine, taken along a centerline axis of the turbine engine, according to an embodiment of the present disclosure.

FIG. 2 is a schematic, cross-sectional side view of the gearbox assembly 46, taken along a centerline axis of the gearbox assembly 46, according to an embodiment of the present disclosure. The gearbox assembly 46 includes an epicyclic gear assembly 247 in a compound symmetrical arrangement. The epicyclic gear assembly 247 includes a sun gear 252, a plurality of planet gears 254 (only one of which is visible in FIG. 2), and a ring gear 256. For clarity, only a portion of the gears is shown. The gearbox assembly 46 is a star type or a rotating ring gear type gearbox assembly (e.g., the ring gear 256 is rotating and a planet carrier 280 is fixed and stationary). In such an arrangement, the fan 38 (FIG. 1) is driven by the ring gear 256. In this way, the ring gear 256 is an output of the gearbox assembly 46. However, other suitable types of gearbox assemblies 46 may be employed. In one non-limiting embodiment, the gearbox assembly 46 may be a planetary arrangement, in which the ring gear 256 is held fixed, with the planet carrier 280 allowed to rotate. In such an arrangement, the fan 38 is driven by the planet carrier 280. In this way, the plurality of planet gears 254 are the output of the gearbox assembly 46. In another non-limiting embodiment, the gearbox assembly 46 may be a differential gearbox in which the ring gear 256 and the planet carrier 280 are both allowed to rotate.

An input shaft 236 is coupled to the sun gear 252. The input shaft 236 is coupled to the turbine section 27 (FIG. 1). For example, the input shaft 236 can be coupled to the LP shaft 36 (FIG. 1). Radially outward of the sun gear 252, and intermeshing therewith, is the plurality of planet gears 254 that are coupled together and supported by the planet carrier 280. The planet carrier 280 supports and constrains the plurality of planet gears 254 such that the plurality of planet gears 254 do not together rotate around the sun gear 252 while enabling each planet gear of the plurality of planet gears 254 to rotate about its own axis 13. Radially outwardly of the plurality of planet gears 254, and intermeshing therewith, is the ring gear 256, which is an annular ring gear. FIG. 2 shows the ring gear 256 is formed of two separate components that are coupled together. In some embodiments, the ring gear 256 may be a single unitary component. The ring gear 256 is coupled via an output shaft 245 to the fan 38 (FIG. 1) and rotates to drive rotation of the fan 38 (FIG. 1) about the centerline axis 12. For example, the output shaft 245 is coupled to the fan shaft 45 (FIG. 1).

Each of the plurality of planet gears 254 is a compound gear that includes a first stage planet gear 260 and a second stage planet gear 262 coupled together. The first stage planet gear 260 includes a greater diameter than a diameter of the second stage planet gear 262. Each of the sun gear 252, the plurality of planet gears 254, and the ring gear 256 comprises teeth about their periphery to intermesh with the other gears. For example, each of the sun gear 252, the plurality of planet gears 254, and the ring gear 256 is double helical gears with first and second sets of helical teeth that are inclined at an acute angle relative to each other. In particular, the sun gear 252 comprises a first set of sun gear teeth 264 and a second set of sun gear teeth 266. Each of the first stage planet gears 260 includes a first set of planet gear teeth 268 and a second set of planet gear teeth 270, and each of the second stage planet gears 262 includes a third set of planet gear teeth 272 and a fourth set of planet gear teeth 274. The ring gear 256 includes a first set of ring gear teeth 276 and a second set of ring gear teeth 278. The sun gear 252, the plurality of planet gears 254, and the ring gear 256 may include any type of gear, such as, for example, spur gears (e.g., gear teeth that are straight cut and are not set at an angle relative to each other), or the like.

The first set of planet gear teeth 268 and the second set of planet gear teeth 270 of the first stage planet gear 260 mesh with the first set of sun gear teeth 264 and the second set of sun gear teeth 266 of the sun gear 252, respectively. The third set of planet gear teeth 272 of the second stage planet gear 262 meshes with the first set of ring gear teeth 276 of the ring gear 256. The fourth set of planet gear teeth 274 of the second stage planet gear 262 meshes with the second set of ring gear teeth 278 of the ring gear 256. In some examples, the gears may be single gears that are not compound gears.

Each of the planet gears 254 of the plurality of planet gears 254 includes a pin 282 about which a respective planet gear 254 rotates. The pin 282 is coupled to the planet carrier 280 and is disposed within a bore 283 of a respective planet gear 254. Lubricant (e.g., oil) is provided between the pin 282 and a respective planet gear 254 such that the planet gear 254 rotates with respect to the pin 282. The second stage planet gear 262 is supported by one or more cylindrical roller bearings 285 that are disposed within the bore 283. FIG. 2 shows four roller bearings 285, but a respective planet gear 254 can include any number of roller bearings 285, as desired. The one or more roller bearings 285 allow rotation of the planet gear 254 with respect to the pin 282. In some examples, the one or more roller bearings 285 may be ball bearings.

Each pin 282 includes a strain sensor 202 mounted therein. For example, the strain sensor 202 is mounted on an inner surface of the pin 282 and within a bore 287 of the pin 282, as detailed further below. The strain sensor 202 measures strain on an object (e.g., the pin 282). For example, the strain sensor 202 is a strain gauge in which resistance varies with applied force on the strain sensor 202. The strain sensor 202 converts force, pressure, tension, or weight into a change in electrical resistance that is measured. The change in electrical resistance corresponds to the amount of strain on the object. The strain sensor 202 converts the measured change in electrical resistance into an electrical signal indicative of the strain on the object and sends the electrical signal to a controller, as detailed further below. In this way, the strain sensor 202 produces and outputs a signal or strain information indicative of the strain on the pin 282. The strain information, for example, includes the change in the electrical resistance and the controller processes the strain information to determine strain of the pin 282. The strain information can include any type of information or signal indicative of strain.

Figure 3:
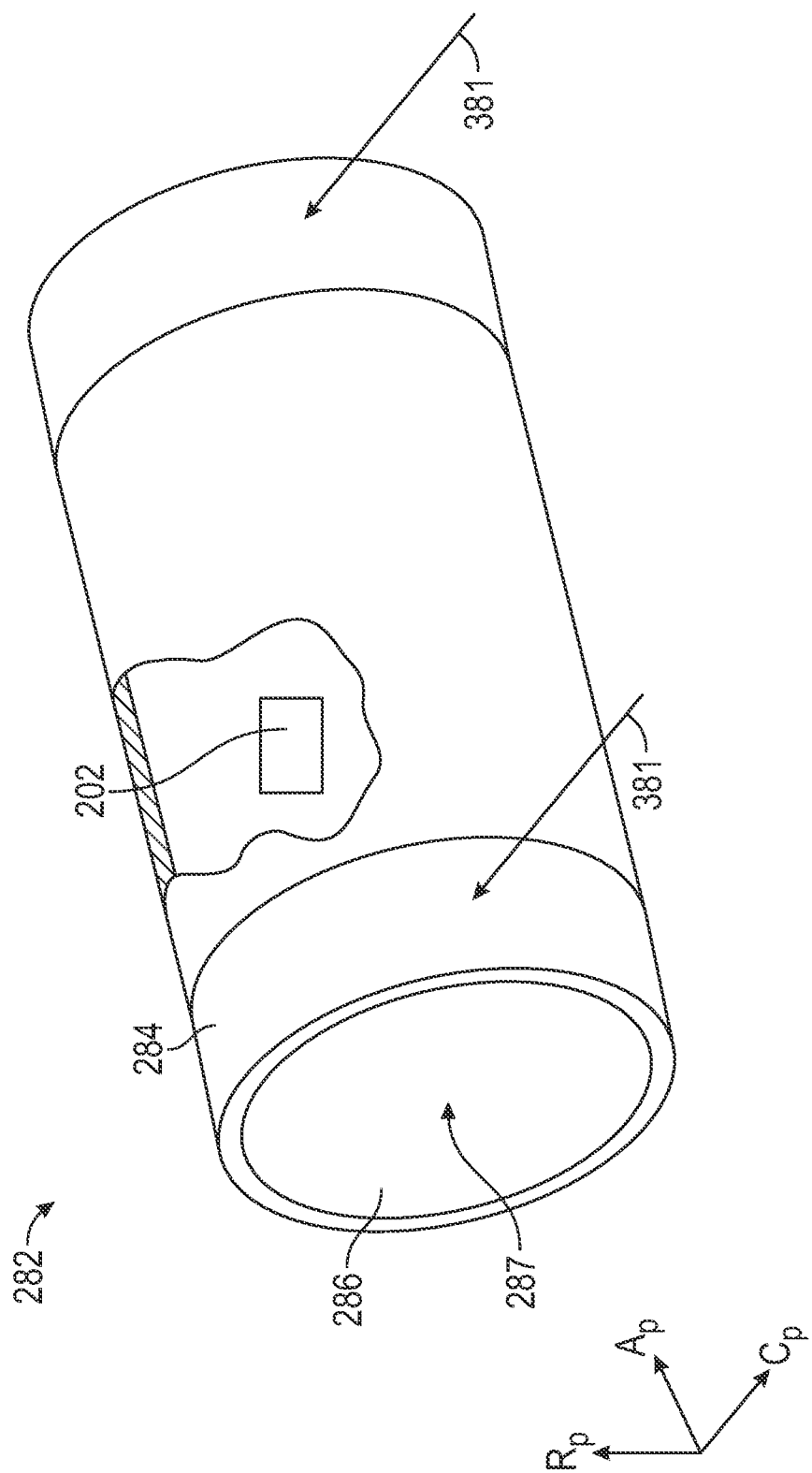
FIG. 3 is a schematic partial cutaway side view of a pin isolated from the gearbox assembly of FIG. 2, according to an embodiment of the present disclosure.

FIG. 3 is a schematic partial cutaway side view of a pin 282 isolated from the gearbox assembly 46 (FIG. 2), according to an aspect of the present disclosure. FIG. 3 shows a partial cross section of the pin 282 for clarity such that an inner portion of the pin 282 is visible in FIG. 3. The pin 282 defines an axial direction $A_p$, a radial direction $R_p$ that is normal to the axial direction $A_p$, and a circumferential direction $C_p$. The pin 282 includes an outer surface 284 and an inner surface 286. While the gearbox assembly 46 operates, the one or more roller bearings 285 (FIG. 2) transfer a force 381 onto the pin 282. The force 381 acting on the pin 282 causes a strain throughout the pin 282. A maximum strain on the pin 282 occurs at a generally axial center location of the pin 282 (e.g., axially equidistant between the one or more roller bearings 285) and at a circumferential location opposite to the location of the force 381 acting on the pin 282. Accordingly, the strain sensor 202 is positioned on the inner surface 286 of the pin 282 at a location of the pin 282 where the strain on the pin 282 is substantially a maximum. The location where the strain on the pins 282 is substantially a maximum includes an axial component, a radial component, and a circumferential component on the pin 282, as detailed above. In this way, the strain sensor 202 more accurately and precisely measures the strain on the pin 282 as compared to the arrangement in which the strain sensor 202 is positioned in other locations of the pin 282.

Figure 4:
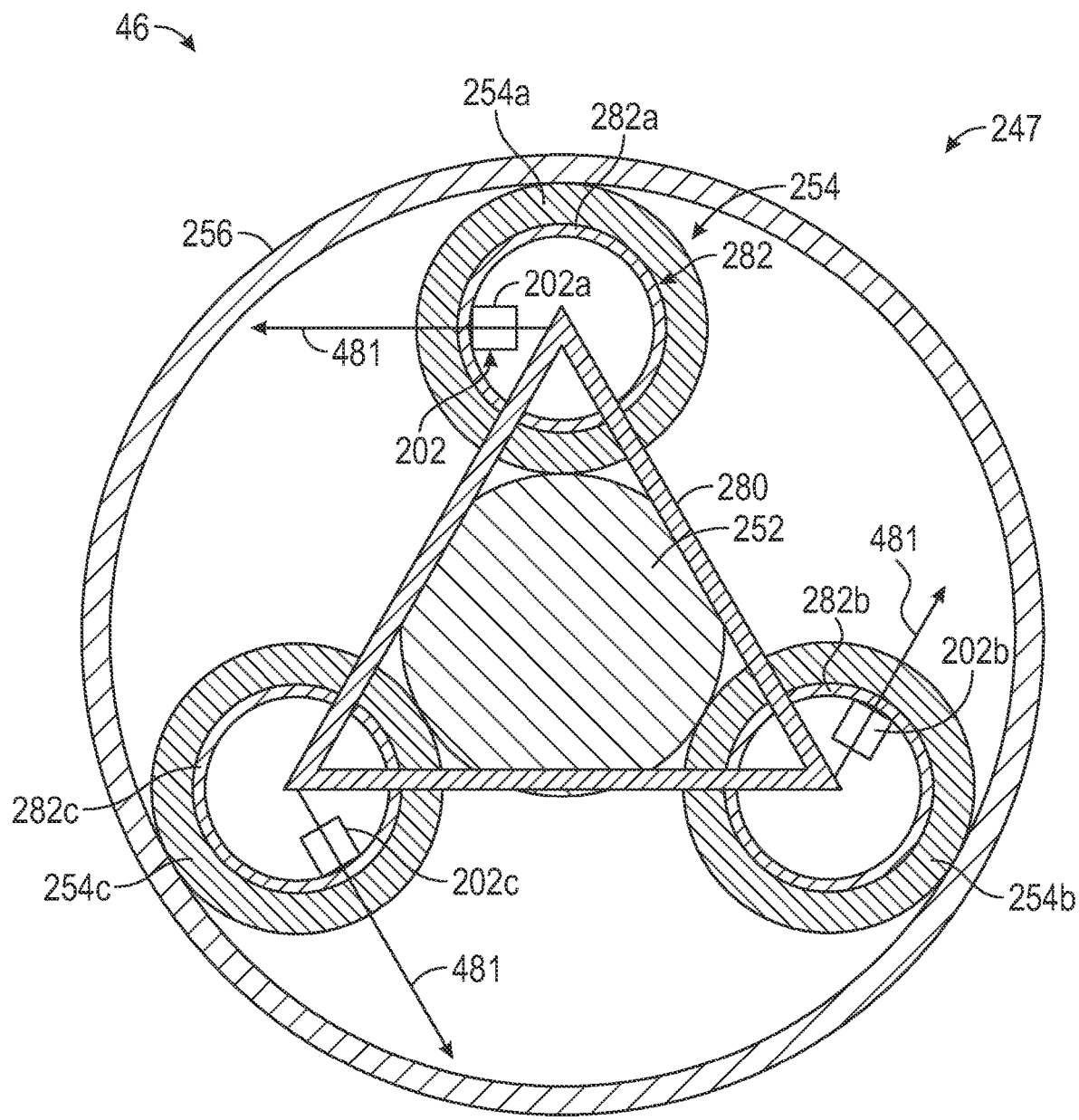
FIG. 4 is a schematic axial end cross-sectional view of an epicyclic gear assembly of the gearbox assembly of FIG. 2, according to an embodiment of the present disclosure.

FIG. 4 shows a schematic axial end cross-sectional view of the epicyclic gear assembly 247 of the gearbox assembly 46, according to an embodiment of the present disclosure. The epicyclic gear assembly 247 includes the sun gear 252, the plurality of planet gears 254, and the ring gear 256. Although not shown in FIG. 4 for clarity, each of the sun gear 252, the plurality of planet gears 254, and the ring gear 256 comprises teeth about their periphery to intermesh with the other gears, as detailed above.

The plurality of planet gears 254 includes three planet gears including a first planet gear 254a, a second planet gear 254b, and a third planet gear 254c. Each planet gear 254 of the plurality of planet gears 254 includes a respective pin 282. For example, the first planet gear 254a includes a first pin 282a, the second planet gear 254b includes a second pin 282b, and the third planet gear 254c includes a third pin 282c. Each pin 282 includes a strain sensor 202 disposed therein. For example, the first pin 282a includes a first strain sensor 202a, the second pin 282b includes a second strain sensor 202b, and the third pin 282c includes a third strain sensor 202c. While FIG. 4 shows three such planet gears, pins, and strain sensors, the gearbox assembly 46 can include any number of planet gears, pins, or strain sensors, as desired.

During operation of the gearbox assembly 46, a torque is applied on the plurality of planet gears 254 via the input shaft 236 (FIG. 2) through the sun gear 252. The torque causes the plurality of planet gears 254 to rotate about the pins 282. As the plurality of planet gears 254 rotate about the pins 282, a force 481 acts on each planet gear 254 and each pin 282 due to the rotation of the planet gears 254. The force 481 acting on the planet gears 254 causes a strain on the planet gears 254, the pins 282, and other components of the gearbox assembly 46 (e.g., the sun gear 252, the ring gear 256, etc.). For example, the force 481 can cause the planet gears 254 or the pins 282 to deform or can cause the pins 282 to contact an inner surface of the planet gears 254 such that the planet gears 254 or the pins 282 wear or become damaged. Thus, the strain sensors 202 measure the strain acting upon the pins 282 such that health of the pins 282 and the other components of the gearbox assembly 46 can be predicted, as detailed further below. The strain sensors 202 are positioned within the pins 282 in a location where the strain on the pins 282 is substantially a maximum, as detailed above.

Figure 5A:
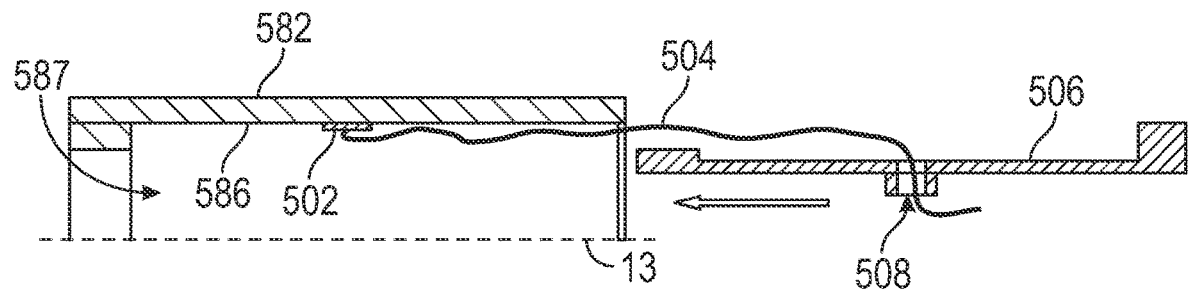
FIG. 5A is a schematic, cross-sectional side view of an installation of a strain sensor and a lubricant sleeve in a pin for a gearbox assembly, taken along an axis of the pin, according to an embodiment of the present disclosure.

FIG. 5A is a schematic, cross-sectional side view of an installation of a strain sensor 502 and a lubricant sleeve 506 in a pin 582 for a gearbox assembly, taken along an axis 13 of the pin 582, according to an embodiment of the present disclosure. The pin 582 may be utilized in the gearbox assembly 46 (FIG. 2) for the turbine engine 10 (FIG. 1). FIG. 5A shows the strain sensor 502 while being installed in the pin 582 and shows only a top portion of the pin 582. The strain sensor 502 is mounted within a bore 587 of the pin 582 and is coupled to an inner surface 586 of the pin 582, as detailed above. The strain sensor 502 is coupled to the pin 282 by adhesive, or the like, and can be coupled to the pin 282 by any coupling arrangement. The strain sensor 502 includes a cable 504 in communication with a controller for sending data to the controller, as detailed further below.

A lubricant sleeve 506 is inserted into the bore 587 of the pin 582 such that a pressurized lubricant (e.g., oil) chamber, as detailed further below, is formed for supplying lubricant between the pin 582 and the planet gear 254 (FIG. 2) such that the planet gear 254 can rotate about the pin 582. The lubricant sleeve 506 is an annular sleeve that provides a chamber for supplying lubricant to the pin 582. The lubricant sleeve 506 includes an aperture 508 for receiving the cable 504 of the strain sensor 502. The aperture 508 includes a size and a shape such that the cable 504 can fit through the aperture 508. FIG. 5A shows that the cable 504 is inserted through the aperture 508 prior to the lubricant sleeve 506 being inserted into the bore 587 of the pin 582. After the cable 504 is fed through the aperture 508, the lubricant sleeve 506 is then inserted into and mounted within the pin 282.

Figure 5B:
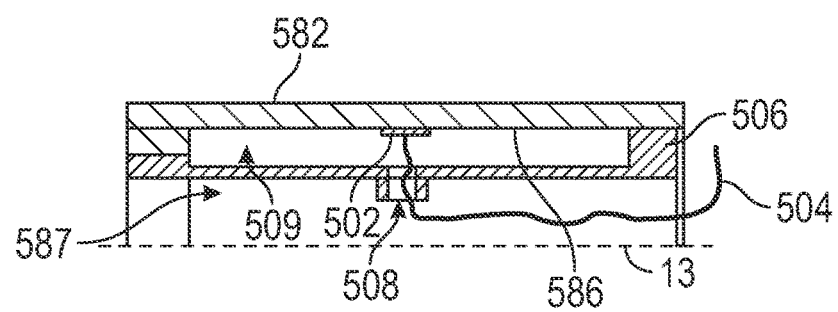
FIG. 5B is a schematic, cross-sectional side view of the strain sensor and the lubricant sleeve in the pin of FIG. 5A in an assembled state, according to an embodiment of the present disclosure.

FIG. 5B is a schematic, cross-sectional side view of the strain sensor 502 and the lubricant sleeve 506 in the pin 582 in an assembled state, according to an embodiment of the present disclosure. When the lubricant sleeve 506 is mounted within the bore 587 of the pin 582, the cable 504 is guided through the aperture 508 and through the bore 587 out of pin 582 such that the cable can be connected to a controller to provide communication between the strain sensor 502 and the controller, as detailed further below. The lubricant sleeve 506 defines a lubricant chamber 509 between the lubricant sleeve 506 and the inner surface 586 of the pin 582. During operation of the gearbox assembly, lubricant is supplied between the pin 582 and the planet gear 254 (FIG. 2) to the one or more roller bearings 285 (FIG. 2) via the lubricant chamber 509. In this way, the roller bearings are lubricated during operation.

Figure 6:
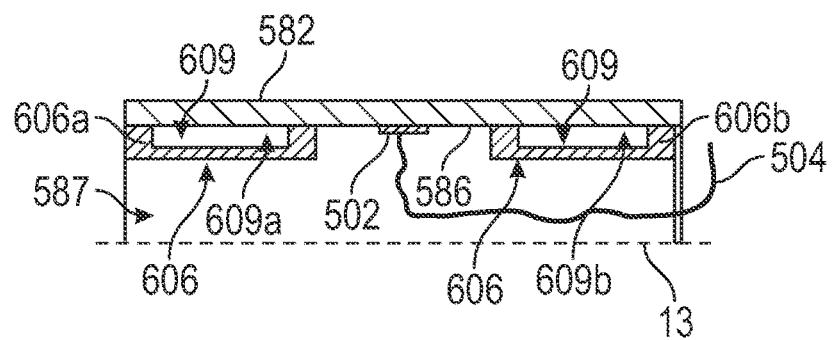
FIG. 6 is a schematic, cross-sectional side view of the strain sensor of FIG. 5B and another lubricant sleeve in the pin of FIG. 5B in an assembled state, taken along an axis of the pin, according to another embodiment of the present disclosure.

FIG. 6 is a schematic, cross-sectional side view of the strain sensor 502 and another lubricant sleeve 606 in the pin 582 in an assembled state, taken along an axis 13 of the pin 582, according to another embodiment of the present disclosure. The lubricant sleeve 606 includes a plurality of lubricant sleeves 606 including a first lubricant sleeve 606a and a second lubricant sleeve 606b. The lubricant sleeves 606 are annular sleeves that each provides a chamber, as detailed further below, for supplying lubricant to the pin 582. The lubricant sleeves 606 are axially aligned with the one or more roller bearings 285 (FIG. 2). For example, the first lubricant sleeve 606a is axially aligned with a first set of roller bearings 285 (FIG. 2) positioned at a forward end of the pin 582 and the second lubricant sleeve 606b is axially aligned with a second set of roller bearings 285 (FIG. 2) positioned at an aft end of the pin 582.

When the strain sensor 502 is mounted within the pin 582, the cable 504 is guided between the first lubricant sleeve 606a and the second lubricant sleeve 606b, through the bore 587, and out of the pin 582. Each lubricant sleeve 606 defines a lubricant chamber 609. For example, the first lubricant sleeve 606a defines a first lubricant chamber 609a and the second lubricant sleeve 606b defines a second lubricant chamber 609b for supplying lubricant to the pin 582 at the respective locations of the first set of roller bearings 285 (FIG. 2) and the second set of roller bearings 285 (FIG. 2). In some examples, the strain sensor 502 includes a wireless sensor such that the cable 504 is omitted and the data measured by the strain sensor 502 is sent to the controller wirelessly (e.g., via Wi-Fi, Bluetooth, cellular, or the like).

Figure 7:
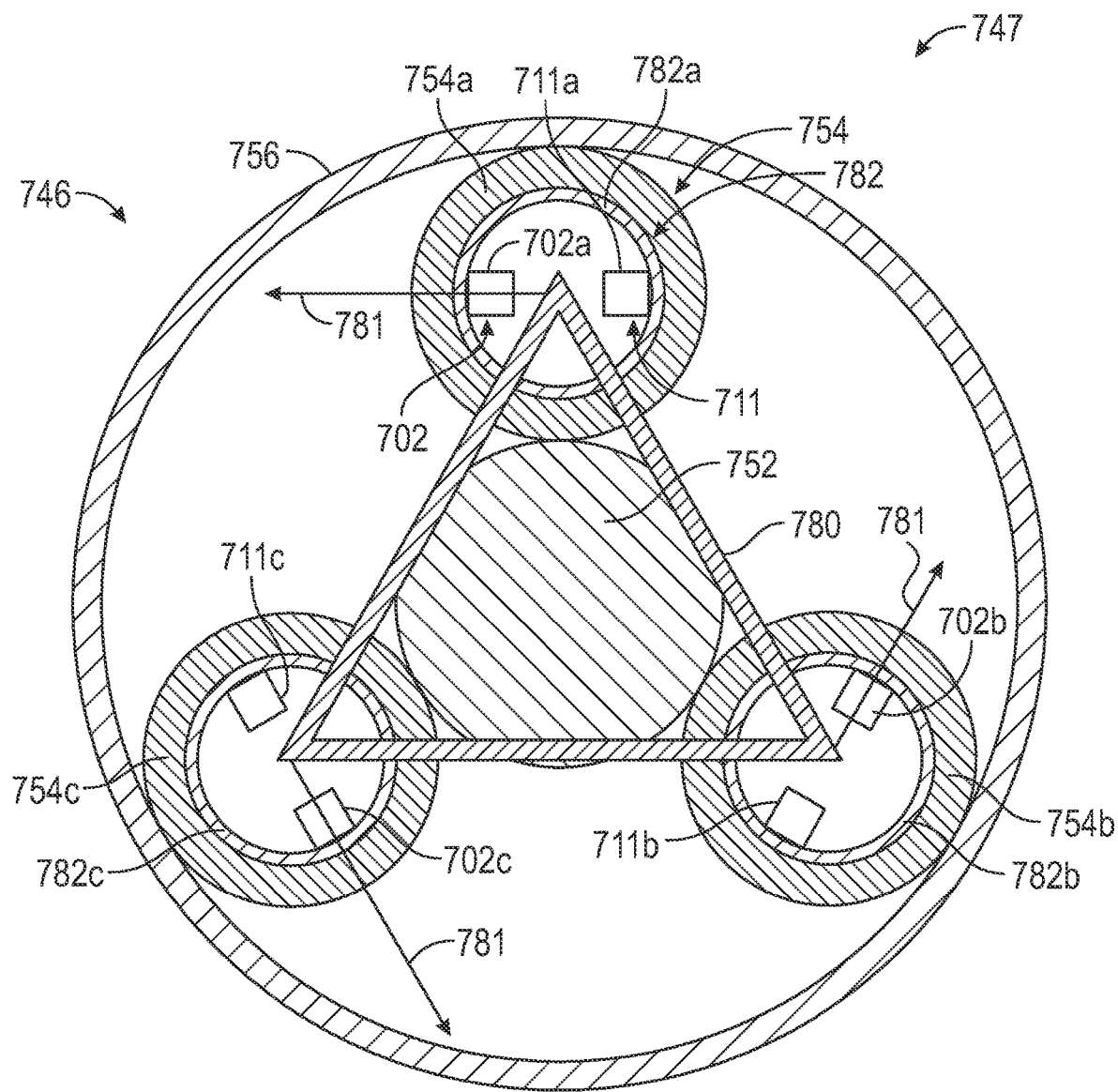
FIG. 7 is a schematic axial end cross-sectional view of an epicyclic gear assembly of a gearbox assembly for a turbine engine, according to another embodiment of the present disclosure.

FIG. 7 shows a schematic axial end cross-sectional view of an epicyclic gear assembly 747 of a gearbox assembly 746 for a turbine engine, according to another embodiment of the present disclosure. The gearbox assembly 746 may be utilized in the turbine engine 10 (FIG. 1) and includes many of the same or similar components as the gearbox assembly 46 (FIG. 2). The epicyclic gear assembly 747 includes a sun gear 752, a plurality of planet gears 754, and a ring gear 756. Although not shown in FIG. 7 for clarity, each of the sun gear 752, the plurality of planet gears 754, and the ring gear 756 comprises teeth about their periphery to intermesh with the other gears, as detailed above.

The plurality of planet gears 754 includes three planet gears including a first planet gear 754a, a second planet gear 754b, and a third planet gear 754c. Each planet gear 754 of the plurality of planet gears 754 includes a respective pin 782 and is constrained by a planet carrier 780. For example, the first planet gear 754a includes a first pin 782a, the second planet gear 754b includes a second pin 782b, and the third planet gear 754c includes a third pin 782c. Each pin 782 includes a first sensor, also referred to as a strain sensor 702, disposed therein. For example, the first pin 782a includes a first strain sensor 702a, the second pin 782b includes a second strain sensor 702b, and the third pin 782c includes a third strain sensor 702c. Each pin 782 includes a second sensor, also referred to as a vibration sensor 711, disposed therein. For example, the first pin 782a includes a first vibration sensor 711a, the second pin 782b includes a second vibration sensor 711b, and the third pin 782c includes a third vibration sensor 711c. While FIG. 7 shows three such planet gears, pins, strain sensors, and vibration sensors, the gearbox assembly 746 can include any number of planet gears, pins, strain sensors, or vibration sensors, as desired.

The vibration sensors 711 are accelerometers that measure acceleration or vibration of an object. The vibration sensors 711 may be any type of vibration sensor for detecting or for measuring acceleration or vibration in three dimensions (e.g., on an x-axis, on a y-axis, and on a z-axis). The vibration sensors 711 produce and output a signal or vibration information indicative of a level of vibration of the pins 782. For example, the vibration sensors 711 measure acceleration or vibration of the pins 782 (e.g., via the components of the gearbox assembly 746) and convert the measured vibration into an electrical signal indicative of the vibration measured. The vibration sensors 711 are in communication with a controller for sending the electrical signal to the controller, as detailed further below. The vibration information includes the measured acceleration, and the controller processes the vibration information to determine vibration of the pin 782. The vibration information can include any type of information or signal indicative of vibration.

During operation of the gearbox assembly 746, a torque is applied on the plurality of planet gears 754 via the input shaft 236 (FIG. 2) through the sun gear 752. The torque causes the plurality of planet gears 754 to rotate about the pins 782. As the plurality of planet gears 754 rotate about the pins 782, a force 781 acts on each planet gear 754 and each pin 782 due to the rotation of the planet gears 754. The force 781 acting on the planet gears 754 causes a strain on the planet gears 754, the pins 782, and other components of the gearbox assembly 746 (e.g., the sun gear 752, the ring gear 756, etc.). For example, the force 781 can cause the planet gears 754 or the pins 782 to deform or can cause the pins 782 to contact an inner surface of the planet gears 754 such that the planet gears 754 or the pins 782 wear or become damaged. Thus, the strain sensors 702 measure the strain acting upon the pins 782. Further, if a component of the gearbox assembly 746 is damaged, the components of the gearbox assembly 746 may vibrate at a greater frequency as compared to an arrangement in which the components are not damaged. Thus, the vibration sensors 711 measure the vibrations of the pins 782 and the other components of the gearbox assembly 746. A controller can integrate the measured strain and the measured vibration information such that health of the pins 782 and the other components of the gearbox assembly 746 can be predicted, as detailed further below. The strain sensors 702 are positioned within the pins 782 in a location where the strain on the pins 782 is substantially a maximum, as detailed above. The vibration sensors 711 are positioned within the pins 782 opposite the strain sensors 702.

Figure 8:
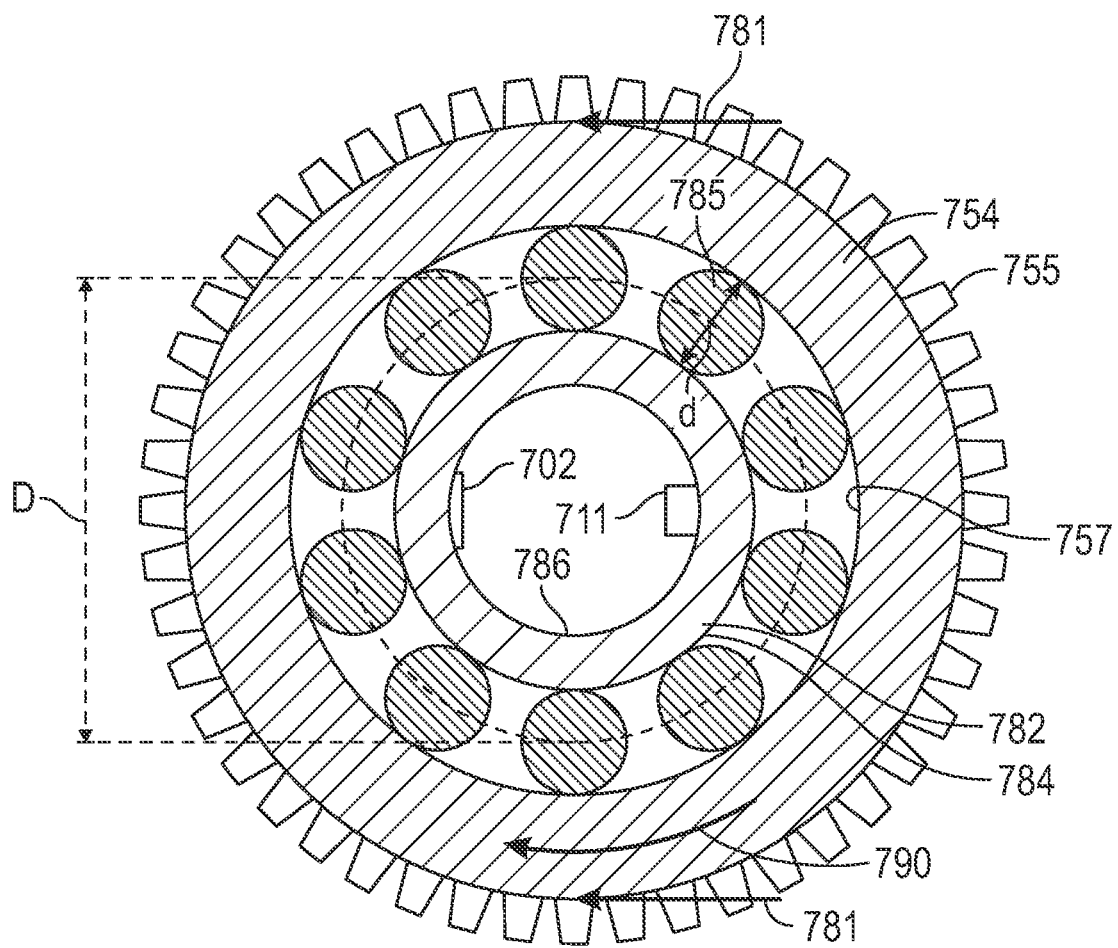
FIG. 8 is a schematic axial end cross-sectional view of a planet gear isolated from the gearbox assembly of FIG. 7, according to an embodiment of the present disclosure.

FIG. 8 shows a schematic axial end cross-sectional view of a planet gear 754 isolated from the gearbox assembly 746, according to an embodiment of the present disclosure. FIG. 8 shows that the planet gear 754 includes a plurality of planet gear teeth 755 that mesh with sun gear teeth of the sun gear 752 (FIG. 7) and that mesh with ring gear teeth of the ring gear 756 (FIG. 7). The strain sensor 702 and the vibration sensor 711 are coupled to an inner surface 786 of the pin 782. A plurality of roller bearings 785 are disposed between an outer surface 784 of the pin 782 and an inner surface 757 of the planet gear 754. Thus, the outer surface 784 of the pin 782 defines an inner race for the roller bearings 785 and the inner surface 757 of the planet gear 754 defines an outer race for the roller bearings 785. The roller bearings 785 enable rotation of the planet gear 754 with respect to the pin 782, as detailed above.

The roller bearings 785 each includes a roller bearing diameter d and the roller bearings 785 are arranged about a roller bearing pitch diameter D. The roller bearing pitch diameter D is a diameter of a pitch circle (shown by dashed lines in FIG. 8) of the roller bearings 785. During operation of the gearbox assembly 746 (FIG. 7), the sun gear 752 (FIG. 7) transfers torque from the input shaft 236 (FIG. 2) to the planet gears 754 and the planet gears 754 transfer torque to the ring gear 756 (FIG. 7). In this way, the sun gear, the planet gears, and the ring gear all rotate. The planet gears 754 rotate at a planet gear rotation speed 790 and the force 781 acts on the planet gears 754 and the pins 782.

Figure 9:
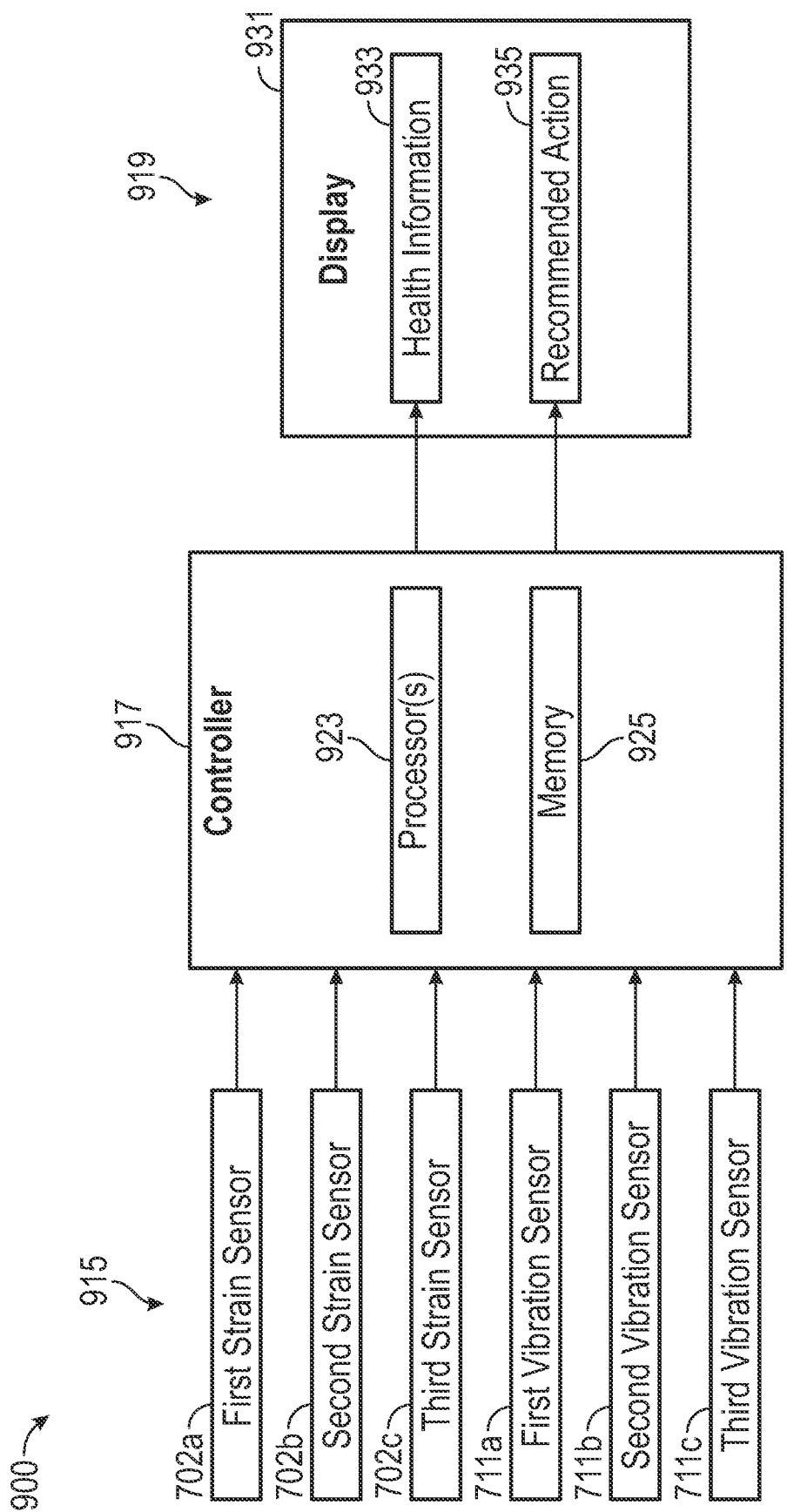
FIG. 9 is a schematic view of a gearbox assembly health prediction system for operation and control of at least portions of the gearbox assembly of FIG. 7, according to an embodiment of the present disclosure.

FIG. 9 is a schematic view of a gearbox assembly health prediction system 900 for operation and control of at least portions of the gearbox assembly 746 (FIG. 7). The gearbox assembly health prediction system 900 includes inputs 915, a controller 917, and outputs 919. The inputs 915 include a first strain signal from the first strain sensor 702a, a second strain signal from the second strain sensor 702b, a third strain signal from the third strain sensor 702c, a first vibration signal from the first vibration sensor 711a, a second vibration signal from the second vibration sensor 711b, and a third vibration signal from the third vibration sensor 711c. The first strain signal, the second strain signal, and the third strain signal each include an electrical signal indicative of the strain on the respective pins. The first vibration signal, the second vibration signal, and the third vibration signal each include a signal indicative of a level of vibration of the respective pins. The outputs 919 include a display 931 or another type of output indicator. The outputs 919 include displaying health information 933 on the display 931 and displaying a recommended action 935 on the display 931.

The display 931 can include any type of display for displaying information and may be located remote from the gearbox assembly 746 (e.g., in an aircraft cockpit and/or at a ground station). The controller 917 receives the inputs 915, implements a method of determining health of the gearbox assembly 746, and controls the outputs 919, as described with reference to FIG. 12 below.

The controller 917 may be a standalone controller part of an engine controller configured to operate various systems of the turbine engine 10 (FIG. 1). In this embodiment, the controller 917 is a computing device having one or more processors 923 and a memory 925. The one or more processors 923 can be any suitable processing device, including, but not limited to, a microprocessor, a microcontroller, an integrated circuit, a logic device, a programmable logic controller (PLC), an application specific integrated circuit (ASIC), or a Field Programmable Gate Array (FPGA). The memory 925 can include one or more computer-readable media, including, but not limited to, non-transitory computer-readable media, a computer readable non-volatile medium (e.g., a flash memory), a RAM, a ROM, hard drives, flash drives, or other memory devices.

The memory 925 can store information accessible by the one or more processors 923, including computer-readable instructions that can be executed by the one or more processors 923. The instructions can be any set of instructions or a sequence of instructions that, when executed by the one or more processors 923, cause the one or more processors 923 and the controller 917 to perform operations. The controller 917 and, more specifically, the one or more processors 923 are programmed or configured to perform these operations, such as the operations discussed further below. In some embodiments, the instructions can be executed by the one or more processors 923 to cause the one or more processors 923 to complete any of the operations and functions for which the controller 917 is configured, as will be described further below. The instructions can be software written in any suitable programming language or can be implemented in hardware. Additionally, or alternatively, the instructions can be executed in logically or virtually separate threads on the processors 923. The memory 925 can further store data that can be accessed by the one or more processors 923.

The technology discussed herein makes reference to computer-based systems and actions taken by, and information sent to and from, computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

The controller 917 is communicatively coupled to the strain sensors 702 (FIG. 7) and the vibration sensors 711 (FIG. 7). The controller 917 receives the inputs 915 from the strain sensors and the vibration sensors and the controller 917 controls the outputs 919, as detailed further below.

Figure 10:
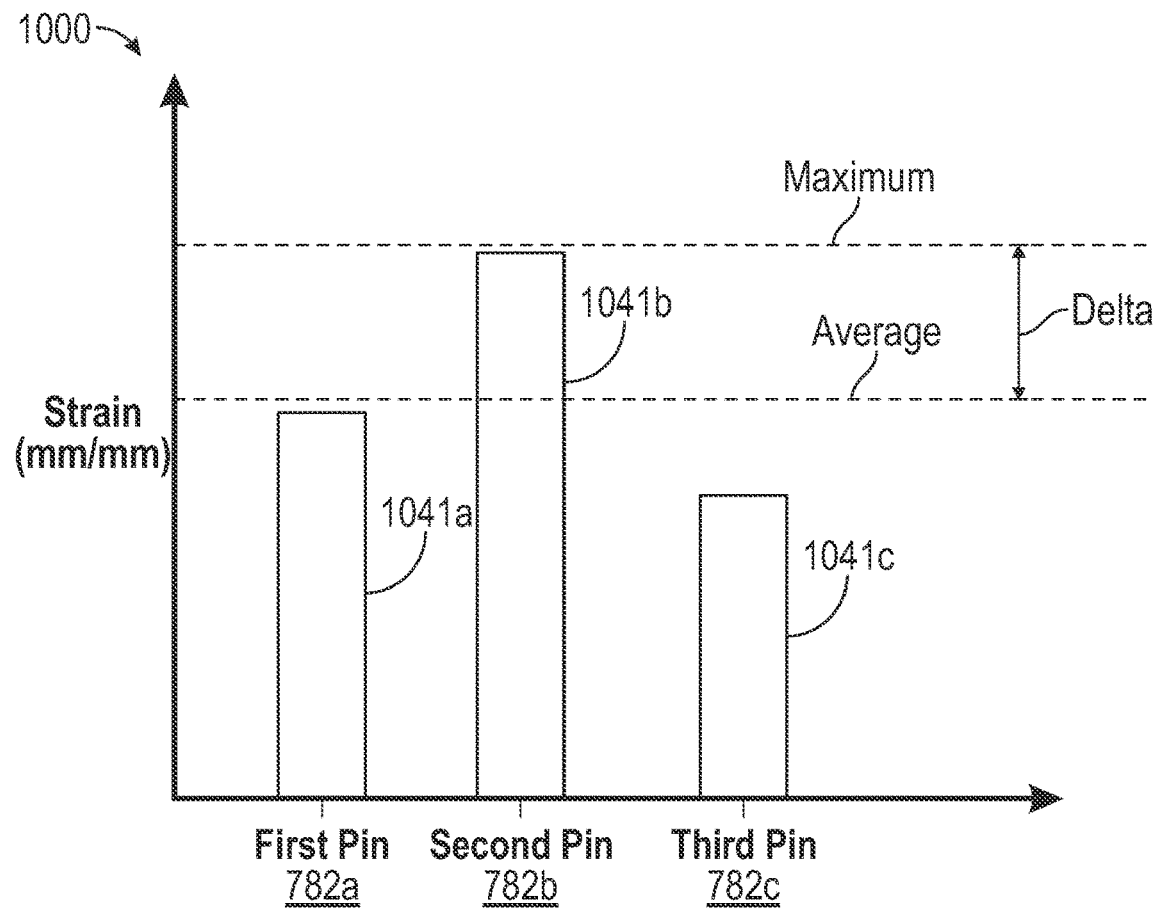
FIG. 10 is an exemplary plot of strain measured by strain sensors for each of the pins of FIG. 7, according to an embodiment of the present disclosure.

FIG. 10 is an exemplary plot 1000 of strain measured by the strain sensors 702 for each of the pins 782 (FIG. 7), according to an embodiment of the present disclosure. The plot 1000 shows exemplary measurement signals indicative of the strains on the first pin 782a, the second pin 782b, and the third pin 782c measured by the first strain sensor 702a (FIG. 7), the second strain sensor 702b (FIG. 7), and the third strain sensor 702c (FIG. 7), respectively, which the controller 917 (FIG. 9) receives as the inputs 915 (FIG. 9). The plot 1000 shows a first strain measurement 1041a on the first pin 782a, a second strain measurement 1041b on the second pin 782b, and a third strain measurement 1041c on the third pin 782c. The strain measurements illustrate the strain experienced on each respective pin 782 during normal operating conditions (e.g., relatively little damage or relatively little wear in the gearbox assembly).

Each pin 782 (FIG. 7) experiences a different amount of strain due to factors such as manufacturing tolerances, assembly tolerances, or design of the gearbox assembly. The factors cause different loads (e.g., forces) to pass to the various planet gears 754 (FIG. 7) during operation of the gearbox assembly. For example, a respective planet gear or a respective pin may experience different loads (e.g., or a load share) than the other planet gears or the other pins due to the respective planet gear or the respective pin being a slightly different size than the other planet gears or the other pins (e.g., due to manufacturing tolerances or design tolerances). The gearbox assembly 746 may also include features (e.g., lubricant holes, etc.) that cause different loads to pass to the planet gears 754 or to the pins 782. Thus, the load sharing between or among the planet gears or between or among the pins may be unequal. The planet gears 754 and the pins 782 may also experience different vibrational frequencies as measured by the vibration sensors 711.

During operation of the gearbox assembly, the components of the gearbox assembly may wear or may otherwise become damaged. Thus, the measured strain and the measured vibration change with respect to the strain and the vibration under normal operating conditions. For example, damage is indicated if the strain on a respective pin 782 (e.g., the second pin 782b) increases for a predetermined amount of time compared to an average strain on the pin 782. The delta between the average strain and the maximum strain measured on the pin 782 indicates an overload (e.g., excessive force) on the pin 782. The overload may indicate low cycle fatigue (e.g., of static components of the gearbox assembly), high cycle fatigue (e.g., of rotating components such as the planet gears, the sun gear, the ring gear, etc.), yield strength of the material of the components, etc. The strain and the vibration measurements thus indicate a health of the components of the gearbox assembly and can indicate life cycle of the components, as detailed further below. The combined strain and vibration information provides for an increased accuracy and determination of the health information of the components of the gearbox assembly as compared to gearbox assemblies without the benefit of the present disclosure.

Figure 11:
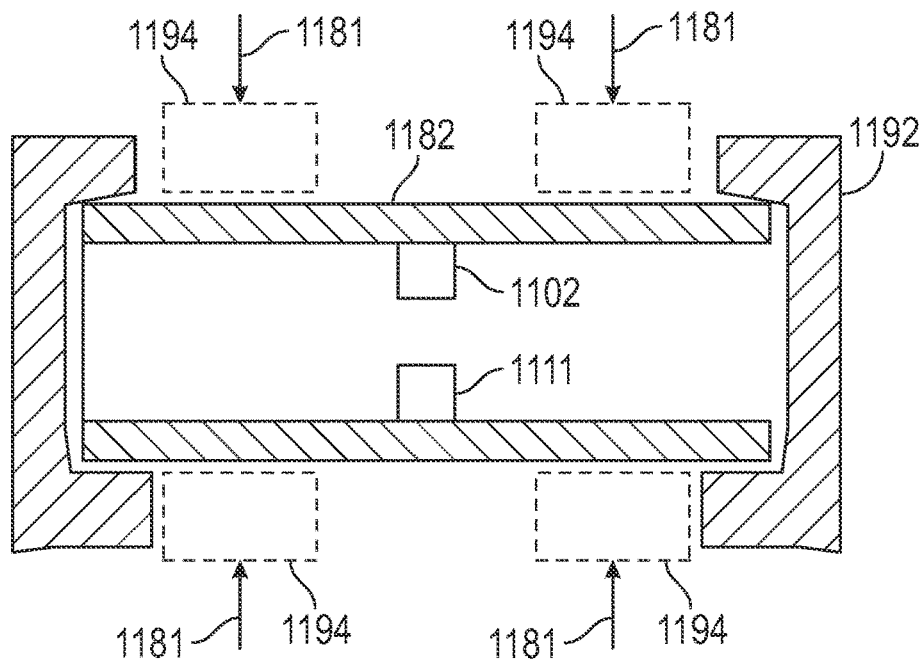
FIG. 11 is a schematic, cross-sectional side view of another pin during a calibration process, taken along a centerline axis of the pin, according to an embodiment of the present disclosure.

FIG. 11 shows a schematic, cross-sectional side view of another pin 1182 during a calibration process, taken along a centerline axis of the pin 1182, according to an embodiment of the present disclosure. The pin 1182 includes a strain sensor 1102 and a vibration sensor 1111. FIG. 11 shows a calibration of the strain sensor 1102 and of the vibration sensor 1111. During the calibration, a user inserts the pin 1182 into a mounting frame 1192 to hold the pin 1182 stationary. One or more load devices 1194 apply forces 1181 on the pin 1182 at various locations about an outer surface of the pin 1182. For example, the load devices 1194 are positioned at locations at which the roller bearings 285 (FIG. 2) contact the pin 1182 when the gearbox assembly is assembled. The load devices 1194 can vary the forces 1181 such that the load devices 1194 vibrate the pin 1182 to calibrate the vibration sensor 1111. The forces 1181 are predetermined (e.g., known) forces and the user or a controller (e.g., a computer) measures the outputs from the strain sensor 1102 and from the vibration sensor 1111 for the predetermined forces. The user or the controller correlates the outputs from the strain sensor 1102 and from the vibration sensor 1111 with the predetermined forces 1181. Thus, the calibration process correlates the outputs with the forces 1181 to ensure the outputs are accurate when the pin 1182 is installed into the gearbox assembly.

Figure 12:
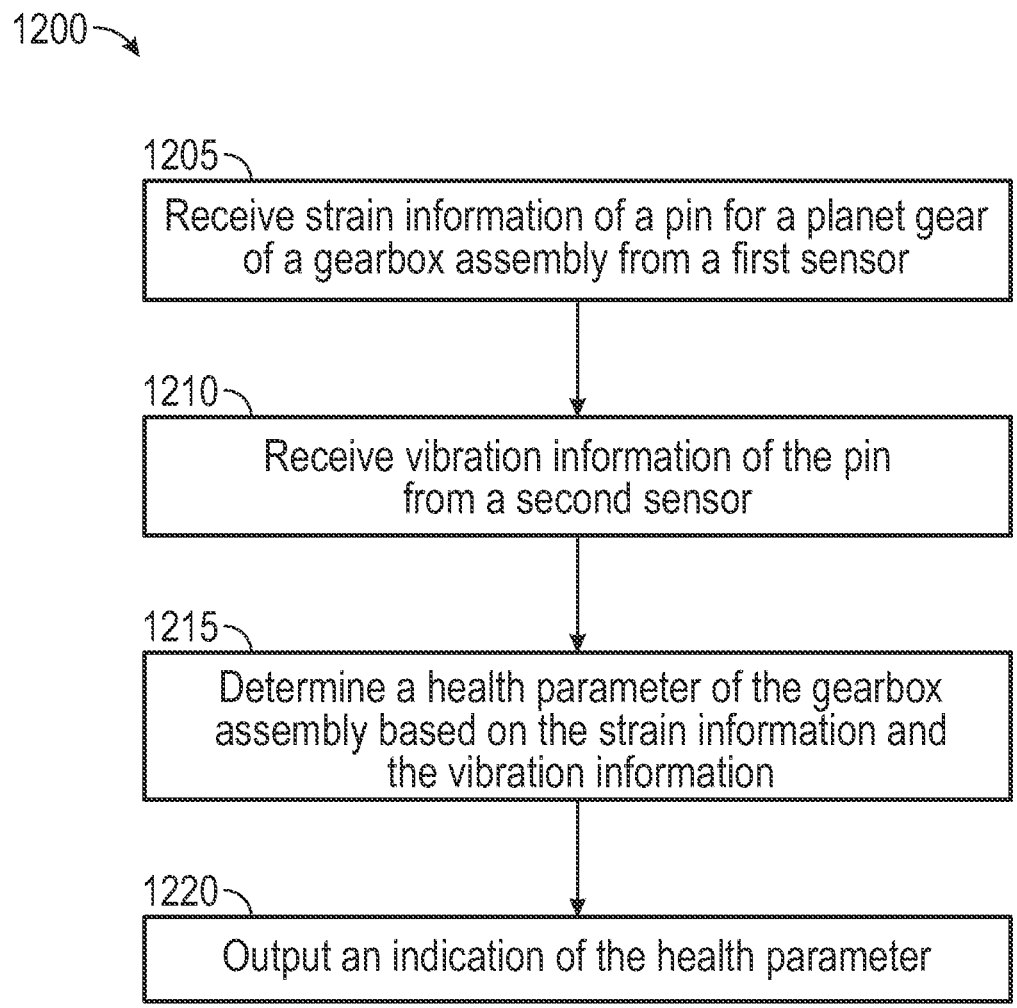
FIG. 12 is a flowchart depicting an exemplary method of determining health of a gearbox assembly, according to an embodiment of the present disclosure.

FIG. 12 is a flowchart depicting an exemplary method 1200 of determining health of the gearbox assembly, according to an embodiment of the present disclosure. With reference to FIGS. 7, 9, and 12, in step 1205, the controller 917 (FIG. 9) receives strain information of a pin 782 (FIG. 7) from a first sensor. The first sensor is the strain sensor 702 (FIG. 7). The controller 917 receives the strain information from each of the strain sensors 702 for each pin 782. For example, the controller 917 receives the first strain signal from the first strain sensor 702a (FIG. 7), the second strain signal from the second strain sensor 702b (FIG. 7), and the third strain signal from the third strain sensor 702c (FIG. 7). The strain information is indicative of strain of the pin 782 (FIG. 7). For example, the strain information includes the first strain signal, the second strain signal, and the third strain signal. From the strain information, the controller 917 (FIG. 9) determines the strain on the respective pins 782.

In step 1210, the controller 917 receives vibration information of the pin 782 from a second sensor. The second sensor is the vibration sensor 711 (FIG. 7). The controller 917 receives the vibration information from each of the vibration sensors 711 for each pin 782. For example, the controller 917 receives the first vibration signal from the first vibration sensor 711a (FIG. 7), the second vibration signal from the second vibration sensor 711b (FIG. 7), and the third vibration signal from the third vibration sensor 711c (FIG. 7). The vibration information is indicative of vibration of the pin 782 (FIG. 7). For example, the vibration information includes the first vibration signal, the second vibration signal, and the third vibration signal. From the vibration information, the controller 917 determines the vibration on the respective pins 782.

In step 1215, the controller 917 determines a health parameter of the gearbox assembly 746 (FIG. 7) based on the strain information and the vibration information. In some embodiments, the controller 917 determines a health parameter of the planet gear 754 (FIG. 7). For example, the controller 917 determines health parameters for the one or more roller bearings 785 (FIG. 8) and determines health parameters for the planet gear mesh (e.g., the planet gear teeth 755 (FIG. 8). The health parameters include roller pass frequencies (RPFs) of the one or more roller bearings 785 and include gear mesh frequencies (GMF) of the planet gear 754. In some embodiments, the controller 917 determines a health parameter of the sun gear 752 (FIG. 7), of the ring gear 756 (FIG. 7), of the roller bearings 785 (FIG. 7), and/or of the pin 782.

The RPFs include an inner race defect frequency ($N_{bpi}$) and an outer race defect frequency ($N_{bpo}$) that indicate defects or indicate damage to the pin 782 or to the planet gear 754 (e.g., on the planet gear teeth 755). A defect can include a spall or other damage to the pin 782 or to the planet gear teeth 755. As detailed above, the pin 782 is an inner race and the planet gear 754 is an outer race for the roller bearings 785. The inner race defect frequency ($N_{bpi}$) and the outer race defect frequency ($N_{bpo}$) are functions of the number roller bearings 785 $n$, the planet gear rotation speed N, the roller bearing diameter d, and the roller bearing pitch diameter D. For example, the inner race defect frequency ($N_{bpi}$) is equal to $n*N*(1+(d/D))/2$ and the outer race defect frequency ($N_{bpo}$) is equal to $n*N*(1+(d/D))/2$, where n is the number of roller bearings 785. The inner race defect frequency ($N_{bpi}$) corresponds to the number of roller bearings n that pass through a given point of the inner race (e.g., the outer surface 784 (FIG. 8) of the pin 782). The outer race defect frequency ($N_{bpo}$) corresponds to the number of roller bearings that pass through a given point of the outer race (e.g., the inner surface 757 (FIG. 8) of the planet gear 754). The relationships of the inner race defect frequency ($N_{bpi}$) and the outer race defect frequency ($N_{bpo}$) above provide the inner race defect frequency ($N_{bpi}$) and the outer race defect frequency ($N_{bpo}$) in theoretical conditions (e.g., no slippage of the roller bearings 785). Roller bearing slippage, however, will shift the frequencies from the theoretical conditions. Therefore, a range or a band about the theoretical frequency is defined as plus or minus ten percent (±10%) of the theoretical frequency to account for slippage of the roller bearings.

The total RPF is determined based on the strain information and the vibration information. For example, the total RPF is a function of the vibration information over the strain information for a give planet gear 754. The controller 917 performs spectral analysis (e.g., a fast Fourier transform) on the strain information and on the vibration information to convert the strain information and the vibration information into a strain frequency domain and into a vibration frequency domain, respectively. The controller 917 then determines the total inner race defect frequency ($N_{bpi}$) based on the strain frequency, the vibration frequency, and the plus or minus ten percent (±10%) of the inner race defect frequency ($N_{bpi}$) determined using the relationship above. The controller 917 also determines the total outer race defect frequency ($N_{bpo}$) based on the strain frequency, the vibration frequency, and the plus or minus ten percent (±10%) of the outer race defect frequency ($N_{bpo}$) determined using the relationship. Thus, the controller 917 then compares the determined total RPF to a baseline RPF. Based on the comparison, the controller 917 determines a defect in one or more components (e.g., the one or more roller bearings 785) of the gearbox assembly 746. For example, the controller 917 can determine the health parameter based on a difference between the determined total RPF to the baseline RPF for the planet gear 754.

The controller 917 similarly determines the GMF for each planet gear 754. The GMF includes a gear mesh defect frequency. A defect can include damage to a planet gear tooth 755, or the like. A baseline GMF is defined as n*N, where n is the number of planet gear teeth 755 and N is the planet gear rotation speed. The baseline GMF is for theoretical conditions (e.g., no slippage of the planet gear teeth 755). Planet gear teeth 755 slippage, however, will shift the frequencies from the theoretical conditions. Therefore, a range or a band about the theoretical frequency is defined as plus or minus ten percent (±10%) of the theoretical frequency to account for slippage of the planet gear teeth 755.

The total GMF is determined based on the strain information and the vibration information. For example, the total GMF is a function of the vibration information over the strain information for a give planet gear 754. The controller 917 performs spectral analysis (e.g., a fast Fourier transform) on the strain information and on the vibration information to convert the strain information and the vibration information into a strain frequency domain and into a vibration frequency domain, respectively. The controller 917 then determines the GMF based on each of the strain frequency domain and the vibration frequency domain. Thus, the controller 917 compares the determined total GMF to the baseline GMF. Based on the comparison, the controller 917 determines a defect in the planet gear teeth 755. For example, the controller 917 can determine the health parameter based on a difference between the determined total GMF to the baseline GMF for the planet gear 754.

In step 1220, the controller 917 outputs an indication of the health parameter 933 (FIG. 9). For example, the controller 917 outputs the health information 933 on the display 931 (FIG. 9). The health information 933 can include a remaining lifecycle of the planet gear 754, of the sun gear 752 (FIG. 7), of the ring gear 756 (FIG. 7), of the roller bearings 785 (FIG. 7), or of the pin 782 (FIG. 7). In some examples, the controller 917 outputs the health information 933 as an alert (e.g., an audible alert, a visual alert such as a light, or the like). The alert can indicate that the components of the gearbox assembly 746 are close to an end of the lifecycle and need to be replaced.

The controller 917 can also determine a recommended action and output the recommended action 935 (FIG. 9) on the display 931. For example, the recommended action 935 can include replacing one or more components of the gearbox assembly 746, scheduling maintenance, powering down the turbine engine, etc. In some examples, the health information 933 and recommended actions 935 include health information and recommended actions for a fleet of aircraft for maintenance management, lifecycle prediction, etc., for the entire fleet of aircraft. In some examples, the controller 917 determines if there is a missing signal from one or more of the strain sensors 702 or from one or more of the vibration sensors 711. If there is a missing signal, the controller 917 can recommend immediate action to replace the respective sensor. In some examples, the controller 917 determines a failure mode (e.g., failure is imminent) of one or more components of the gearbox assembly 746 and recommends immediate action for the failure mode of one or more of the components.

Embodiments of the present disclosure provide for an improved prognostics and health management system for determining the health of various components of the gearbox assembly. The embodiments of the present disclosure provide for a strain sensor and a vibration sensor inside each of the pins of the planet gears. Providing a strain sensor inside the pins enables more accurate and precise load information within the planet gears, the sun gear, or the ring gear, as compared to gearbox assemblies in which strain sensors are installed outside of the gearbox assembly. Further, utilizing both a strain sensor and a vibration sensor provides for increased resolution and more precise measurements in determining the health parameters. Accordingly, the embodiments of the present disclosure provide for improved health determination such that maintenance or replacement of the components of the gearbox assembly can be performed sooner as compared to gearbox assemblies without the benefit of the present disclosure.

Further aspects are provided by the subject matter of the following clauses.

A gearbox assembly comprises a gear assembly, a pin, a first sensor, and a second sensor. The gear assembly includes a planet gear. The pin is disposed within the planet gear, the planet gear being arranged to rotate about the pin. The first sensor is disposed within the pin and is configured to produce a signal indicative of a strain of the pin. The second sensor is disposed within the pin and is configured to produce a signal indicative of a vibration of the planet gear.

The gearbox assembly of the preceding clause, the first sensor being located within the pin at a circumferential location of the pin that is opposite to a location of a force acting on the pin while the planet gear rotates about the pin.

The gearbox assembly of any preceding clause, further comprising a plurality of bearings disposed between the pin and the planet gear, the plurality of bearings transferring the force onto the pin.

The gearbox assembly of any preceding clause, the first sensor being located within the pin at a location where a strain of the pin is substantially a maximum.

The gearbox assembly of any preceding clause, the first sensor being coupled to an inner surface of the pin, and the second sensor is coupled to an inner surface of the pin at a location opposite a location of the first sensor.

The gearbox assembly of any preceding clause, the first sensor being located within the pin at an axial center location of the pin.

The gearbox assembly of any preceding clause, further including a plurality of planet gears, each planet gear of the plurality of planet gears including a pin having a first sensor and a second sensor.

The gearbox assembly of any preceding clause, the first sensor including a cable, the cable being routed through a lubricant sleeve disposed within the pin.

The gearbox assembly of any preceding clause, further comprising an input shaft of a turbine engine and a fan shaft of the turbine engine, the input shaft and the fan shaft coupled to the gear assembly, the input shaft transferring torque through the gear assembly to the fan shaft.

The gearbox assembly of any preceding clause, further comprising a controller that determines a health parameter of the gearbox assembly based on strain information from the first sensor and vibration information from the second sensor.

The gearbox assembly of any preceding clause, further comprising a first set of bearings and a second set of bearings disposed between the pin and the planet gear, the first sensor being located within the pin axially between the first set of bearings and the second set of bearings.

The gearbox assembly of any preceding clause, the lubricant sleeve including an aperture through which the cable of the first sensor is routed.

The gearbox assembly of any preceding clause, the lubricant sleeve including a first lubricant sleeve and a second lubricant sleeve.

The gearbox assembly of any preceding clause, the first lubricant sleeve being disposed within the pin and axially aligned with a first set of bearings, and the second lubricant sleeve being disposed within the pin and axially aligned with a second set of bearings.

A gearbox assembly comprises a gear assembly, a pin, and a strain sensor. The gear assembly includes a planet gear. The pin is disposed within the planet gear, the planet gear being arranged to rotate about the pin. The strain sensor is disposed within the pin and configured to produce a signal indicative of a strain of the pin. The strain sensor is located within the pin at a circumferential location of the pin that is opposite to a location of a force acting on the pin when the planet gear rotates about the pin.

The gearbox assembly of the preceding clause, further comprising a plurality of bearings disposed between the pin and the planet gear, the plurality of bearings transferring the force onto the pin.

The gearbox assembly of any preceding clause, the strain sensor being located within the pin at a location where a strain of the pin is substantially a maximum.

The gearbox assembly of any preceding clause, the strain sensor being located within the pin at an axial center location of the pin.

The gearbox assembly of any preceding clause, further including a plurality of planet gears, each planet gear of the plurality of planet gears including a pin having a strain sensor.

The gearbox assembly of any preceding clause, the strain sensor including a cable, the cable being routed through a lubricant sleeve disposed within the pin.

The gearbox assembly of any preceding clause, the strain sensor being coupled to an inner surface of the pin.

The gearbox assembly of any preceding clause, further comprising a vibration sensor disposed within the pin and configured to produce a signal indicative of a vibration of the pin, the vibration sensor being coupled to an inner surface of the pin at a location opposite a location of the strain sensor.

The gearbox assembly of any preceding clause, further comprising a controller that determines a health parameter of the gearbox assembly based on strain information from the strain sensor.

The gearbox assembly of any preceding clause, further comprising an input shaft of a turbine engine and a fan shaft of the turbine engine, the input shaft and the fan shaft coupled to the gear assembly, the input shaft transferring torque through the gear assembly to the fan shaft.

The gearbox assembly of any preceding clause, further comprising a first set of bearings and a second set of bearings disposed between the pin and the planet gear, the strain sensor being located within the pin axially between the first set of bearings and the second set of bearings.

The gearbox assembly of any preceding clause, the lubricant sleeve including an aperture through which the cable of the first sensor is routed.

The gearbox assembly of any preceding clause, the lubricant sleeve including a first lubricant sleeve and a second lubricant sleeve.

The gearbox assembly of any preceding clause, the first lubricant sleeve being disposed within the pin and axially aligned with a first set of bearings, and the second lubricant sleeve being disposed within the pin and axially aligned with a second set of bearings.

A turbine engine comprises a fan having a fan shaft, a core turbine engine having an input shaft, and a gearbox assembly. The gearbox assembly comprises a gear assembly, a pin, a first sensor, and a second sensor. The gear assembly includes a planet gear, the input shaft and the fan shaft being coupled to the gear assembly. The pin is disposed within the planet gear, the planet gear being arranged to rotate about the pin. The first sensor is disposed within the pin and is configured to produce a signal indicative of a strain of the pin. The second sensor is disposed within the pin and is configured to produce a signal indicative of a vibration of the pin.

The turbine engine of the preceding clause, the first sensor being located within the pin at a circumferential location of the pin that is opposite to a location of a force acting on the pin when the planet gear rotates about the pin.

The turbine engine of any preceding clause, further comprising a plurality of bearings disposed between the pin and the planet gear, the plurality of bearings transferring the force onto the pin.

The turbine engine of any preceding clause, the first sensor being located within the pin at a location where a strain of the pin is substantially a maximum.

The turbine engine of any preceding clause, the first sensor being coupled to an inner surface of the pin, and the second sensor is coupled to an inner surface of the pin at a location opposite a location of the first sensor.

The turbine engine of any preceding clause, the first sensor being located within the pin at an axial center location of the pin.

The turbine engine of any preceding clause, the gearbox assembly further comprising a plurality of planet gears, each planet gear of the plurality of planet gears including a pin having a first sensor and a second sensor.

The turbine engine of any preceding clause, the first sensor including a cable, the cable being routed through a lubricant sleeve disposed within the pin.

The turbine engine of any preceding clause, the input shaft transferring torque through the gear assembly to the fan shaft.

The turbine engine of any preceding clause, further comprising a controller that determines a health parameter of the gearbox assembly based on strain information from the first sensor and vibration information from the second sensor.

The turbine engine of any preceding clause, further comprising a first set of bearings and a second set of bearings disposed between the pin and the planet gear, the first sensor being located within the pin axially between the first set of bearings and the second set of bearings.

The turbine engine of any preceding clause, the lubricant sleeve including an aperture through which the cable of the first sensor is routed.

The turbine engine of any preceding clause, the lubricant sleeve including a first lubricant sleeve and a second lubricant sleeve.

The turbine engine of any preceding clause, the first lubricant sleeve being disposed within the pin and axially aligned with a first set of bearings, and the second lubricant sleeve being disposed within the pin and axially aligned with a second set of bearings.

A turbine engine comprises a fan having a fan shaft, a core turbine engine having an input shaft, and a gearbox assembly. The gearbox assembly includes a gear assembly, a pin, and a strain sensor. The gear assembly includes a planet gear, the input shaft and the fan shaft being coupled to the gear assembly. The pin is disposed within the planet gear, the planet gear being arranged to rotate about the pin. The strain sensor is disposed within the pin and is configured to produce a signal indicative of a strain of the pin. The strain sensor is located within the pin at a circumferential location of the pin that is opposite to a location of a force acting on the pin when the planet gear rotates about the pin.

The turbine engine of the preceding clause, further comprising a plurality of bearings disposed between the pin and the planet gear, the plurality of bearings transferring the force onto the pin.

The turbine engine of any preceding clause, the strain sensor being located within the pin at a location where a strain of the pin is substantially a maximum.

The turbine engine of any preceding clause, the strain sensor being located within the pin at an axial center location of the pin.

The turbine engine of any preceding clause, the gearbox assembly comprising a plurality of planet gears, each planet gear of the plurality of planet gears including a pin having a strain sensor.

The turbine engine of any preceding clause, the strain sensor including a cable, the cable being routed through a lubricant sleeve disposed within the pin.

The turbine engine of any preceding clause, the strain sensor being coupled to an inner surface of the pin.

The turbine engine of any preceding clause, further comprising a vibration sensor disposed within the pin and is configured to produce a signal indicative of a vibration of the pin, the vibration sensor being coupled to an inner surface of the pin at a location opposite a location of the strain sensor.

The turbine engine of any preceding clause, further comprising a controller that determines a health parameter of the gearbox assembly based on strain information from the strain sensor.

The turbine engine of any preceding clause, the input shaft transferring torque through the gear assembly to the fan shaft.

The turbine engine of any preceding clause, further comprising a first set of bearings and a second set of bearings disposed between the pin and the planet gear, the strain sensor being located within the pin axially between the first set of bearings and the second set of bearings.

The turbine engine of any preceding clause, the lubricant sleeve including an aperture through which the cable of the first sensor is routed.

The turbine engine of any preceding clause, the lubricant sleeve including a first lubricant sleeve and a second lubricant sleeve.

The turbine engine of any preceding clause, the first lubricant sleeve being disposed within the pin and axially aligned with a first set of bearings, and the second lubricant sleeve being disposed within the pin and axially aligned with a second set of bearings.

A method of determining health of a gearbox assembly, the method comprising receiving strain information of a pin of a planet gear of the gearbox assembly from a first sensor, and receiving vibration information of the planet gear from a second sensor. The method includes determining a health parameter of the gearbox assembly based on the strain information and the vibration information. The method includes outputting an indication of the health parameter.

The method of the preceding clause, the health parameter including a lifecycle of one or more of the pin, the planet gear, a sun gear of the gearbox assembly, a ring gear of the gearbox assembly, or bearings of the gearbox assembly.

The method of any preceding clause, further comprising determining a recommended action based on the health parameter and outputting the recommended action.

The method of any preceding clause, determining the health parameter includes determining a roller pass frequency of a plurality of bearings of the gearbox assembly based on the strain information and the vibration information.

The method of any preceding clause, determining the health parameter includes comparing the roller pass frequency to a baseline roller pass frequency.

The method of any preceding clause, determining the health parameter including determining a gear mesh frequency of the planet gear based on the strain information and the vibration information.

The method of any preceding clause, determining the health parameter includes comparing the gear mesh frequency to a baseline gear mesh frequency.

The method of any preceding clause, further comprising receiving strain information of a plurality of pins of a plurality of planet gears of the gearbox assembly from a plurality of first sensors, and receiving vibration information of the plurality of planet gears from a plurality of second sensors.

The method of any preceding clause, determining the health parameter including determining a load share on each pin of the plurality of pins.

The method of any preceding clause, determining the load share on each pin of the plurality of pins including comparing the determined roller pass frequency to a baseline roller pass frequency.

The method of any preceding clause, determining the roller pass frequency includes determining an inner race defect frequency of the plurality of bearings.

The method of any preceding clause, the inner race defect frequency is a function of a number of bearings of the plurality of bearings, a planet gear rotation speed of the planet gear, a bearing diameter of the plurality of bearings, and a bearing pitch diameter of the plurality of bearings.

The method of any preceding clause, further comprising determining the inner race defect frequency based on the strain information and the vibration information.

The method of any preceding clause, determining the roller pass frequency includes determining an outer race defect frequency of the plurality of bearings.

The method of any preceding clause, the outer race defect frequency is a function of a number of bearings of the plurality of bearings, a planet gear rotation speed of the planet gear, a bearing diameter of the plurality of bearings, and a bearing pitch diameter of the plurality of bearings.

The method of any preceding clause, the gear mesh frequency is a function of the number of gear teeth of the planet gear and the planet gear rotation speed.

A gearbox assembly health prediction system comprises a controller that receives strain information of a pin of a planet gear of a gearbox assembly from a first sensor, receives vibration information of the planet gear from the second sensor, determines a health parameter of the gearbox assembly based on the strain information and the vibration information, and outputs an indication of the health parameter.

The gearbox assembly health prediction system of the preceding clause, the health parameter including a lifecycle of one or more of the pin, the planet gear, a sun gear of the gearbox assembly, a ring gear of the gearbox assembly, or bearings of the gearbox assembly.

The gearbox assembly health prediction system of any preceding clause, the controller determining a recommended action based on the health parameter and outputting the recommended action.

The gearbox assembly health prediction system of any preceding clause, determining the health parameter includes the controller determining a roller pass frequency of a plurality of bearings of the gearbox assembly based on the strain information and the vibration information.

The gearbox assembly health prediction system of any preceding clause, determining the health parameter includes the controller comparing the roller pass frequency to a baseline roller pass frequency.

The gearbox assembly health prediction system of any preceding clause, determining the health parameter including the controller determining a gear mesh frequency of the planet gear based on the strain information and the vibration information.

The gearbox assembly health prediction system of any preceding clause, determining the health parameter includes the controller comparing the gear mesh frequency to a baseline gear mesh frequency.

The gearbox assembly health prediction system of any preceding clause, the controller receiving strain information of a plurality of pins of a plurality of planet gears of the gearbox assembly from a plurality of first sensors, and receiving vibration information of the plurality of planet gears from a plurality of second sensors.

The gearbox assembly health prediction system of any preceding clause, determining the health parameter including the controller determining a load share on each pin of the plurality of pins.

The gearbox assembly health prediction system of any preceding clause, the controller determining the load share on each pin of the plurality of pins including comparing the determined roller pass frequency to a baseline roller pass frequency.

The gearbox assembly health prediction system of any preceding clause, determining the roller pass frequency includes the controller determining an inner race defect frequency of the plurality of bearings.

The gearbox assembly health prediction system of any preceding clause, the inner race defect frequency being a function of a number of bearings of the plurality of bearings, a planet gear rotation speed of the planet gear, a bearing diameter of the plurality of bearings, and a bearing pitch diameter of the plurality of bearings.

The gearbox assembly health prediction system of any preceding clause, the controller determining the inner race defect frequency based on the strain information and the vibration information.

The gearbox assembly health prediction system of any preceding clause, determining the roller pass frequency includes the controller determining an outer race defect frequency of the plurality of bearings.

The gearbox assembly health prediction system of any preceding clause, the outer race defect frequency being a function of a number of bearings of the plurality of bearings, a planet gear rotation speed of the planet gear, a bearing diameter of the plurality of bearings, and a bearing pitch diameter of the plurality of bearings.

The gearbox assembly health prediction system of any preceding clause, the gear mesh frequency being a function of the number of gear teeth of the planet gear and the planet gear rotation speed.

Although the foregoing description is directed to the preferred embodiments of the present disclosure, other variations and modifications will be apparent to those skilled in the art and may be made without departing from the spirit or the scope of the disclosure. Moreover, features described in connection with one embodiment of the present disclosure may be used in conjunction with other embodiments, even if not explicitly stated above.

The invention claimed is:

1. A gearbox assembly comprising:
a planet gear;
a pin disposed within the planet gear, the planet gear arranged to rotate about the pin;
a first sensor disposed within the pin and configured to produce a signal indicative of a strain of the pin, wherein the first sensor is coupled to an inner surface of the pin; and
a second sensor disposed within the pin and configured to produce a signal indicative of a vibration of the pin, wherein the second sensor is coupled to the inner surface of the pin.

2. The gearbox assembly of claim 1, wherein the first sensor is located within the pin at a circumferential location of the pin that is opposite to a location of a force acting on the pin when the planet gear rotates about the pin.

3. The gearbox assembly of claim 2, further comprising a plurality of bearings disposed between the pin and the planet gear, the plurality of bearings transferring the force onto the pin.

4. The gearbox assembly of claim 1, wherein the first sensor is located within the pin at a location where a strain of the pin is substantially a maximum.

5. The gearbox assembly of claim 1, wherein the second sensor is coupled to the inner surface of the pin at a location opposite a location of the first sensor.

6. The gearbox assembly of claim 1, wherein the first sensor is located within the pin at an axial center location of the pin.

7. The gearbox assembly of claim 1, further including a plurality of planet gears, each planet gear of the plurality of planet gears including a pin having a first sensor and a second sensor.

8. The gearbox assembly of claim 1, wherein the first sensor includes a cable, the cable being routed through a lubricant sleeve disposed within the pin.

9. The gearbox assembly of claim 1, further comprising an input shaft of a turbine engine and a fan shaft of the turbine engine, the input shaft and the fan shaft coupled to the gearbox assembly, wherein the input shaft transfers torque through the gearbox assembly to the fan shaft.

10. The gearbox assembly of claim 1, further comprising a controller that determines a health parameter of the gearbox assembly based on strain information from the first sensor and vibration information from the second sensor.

11. A gearbox assembly comprising:
a gear assembly including a planet gear;
a pin disposed within the planet gear, the planet gear arranged to rotate about the pin; and a strain sensor disposed within the pin and configured to produce a signal indicative of a strain of the pin, wherein the strain sensor is coupled to an inner surface of the pin, and the strain sensor is located within the pin at a circumferential location of the pin that is opposite to a location of a force acting on the pin when the planet gear rotates about the pin.

12. The gearbox assembly of claim 11, further comprising a plurality of bearings disposed between the pin and the planet gear, the plurality of bearings transferring the force onto the pin.

13. The gearbox assembly of claim 12, wherein the plurality of bearings includes a first set of bearings and a second set of bearings, the strain sensor being located within the pin axially between the first set of bearings and the second set of bearings.

14. The gearbox assembly of claim 11, wherein the strain sensor is located within the pin at a location where a strain of the pin is substantially a maximum.

15. The gearbox assembly of claim 11, wherein the strain sensor is located within the pin at an axial center location of the pin.

16. The gearbox assembly of claim 11, further including a plurality of planet gears, each planet gear of the plurality of planet gears including a pin having a strain sensor.

17. The gearbox assembly of claim 11, wherein the strain sensor includes a cable, the cable being routed through a lubricant sleeve disposed within the pin.

18. The gearbox assembly of claim 11, further comprising a vibration sensor disposed within the pin and configured to produce a signal indicative of a vibration of the planet gear, wherein the vibration sensor is coupled to an inner surface of the pin at a location opposite a location of the strain sensor.

19. The gearbox assembly of claim 11, further comprising a controller that determines a health parameter of the gearbox assembly based on strain information from the strain sensor.

20. The gearbox assembly of claim 11, further comprising an input shaft of a turbine engine and a fan shaft of the turbine engine, the input shaft and the fan shaft coupled to the gear assembly, wherein the input shaft transfers torque through the gear assembly to the fan shaft.

* * * * *